United States Patent
Seo et al.

(10) Patent No.: US 10,237,893 B2
(45) Date of Patent: Mar. 19, 2019

(54) METHOD AND DEVICE FOR TRANSMITTING AND RECEIVING SIGNAL TO AND FROM ENB BY USER EQUIPMENT IN WIRELESS COMMUNICATION SYSTEM THAT SUPPORTS CARRIER AGGREGATION

(71) Applicant: LG ELECTRONICS INC., Seoul (KR)

(72) Inventors: Hanbyul Seo, Seoul (KR); Byounghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/329,515

(22) PCT Filed: Sep. 16, 2015

(86) PCT No.: PCT/KR2015/009733
§ 371 (c)(1),
(2) Date: Jan. 26, 2017

(87) PCT Pub. No.: WO2016/043523
PCT Pub. Date: Mar. 24, 2016

(65) Prior Publication Data
US 2017/0223738 A1    Aug. 3, 2017

Related U.S. Application Data

(60) Provisional application No. 62/052,443, filed on Sep. 18, 2014.

(51) Int. Cl.
*H04W 74/08* (2009.01)
*H04W 72/04* (2009.01)
(Continued)

(52) U.S. Cl.
CPC ...... *H04W 74/0816* (2013.01); *H04B 17/318* (2015.01); *H04W 16/14* (2013.01);
(Continued)

(58) Field of Classification Search
CPC . H04W 74/0816; H04W 72/04; H04W 74/08; H04W 16/14; H04W 84/042; H04W 84/12; H04B 17/318
See application file for complete search history.

(56) References Cited

U.S. PATENT DOCUMENTS

2014/0003387 A1* 1/2014 Lee .................. H04L 5/001
370/330
2014/0079015 A1* 3/2014 Kim .................. H04W 28/26
370/329

(Continued)

FOREIGN PATENT DOCUMENTS

KR   1020070086714    8/2007
KR       101151026    6/2012

(Continued)

OTHER PUBLICATIONS

PCT International Application No. PCT/KR2015/009733, Written Opinion of the International Searching Authority dated Dec. 29, 2015, 21 pages.

(Continued)

*Primary Examiner* — Ajay Cattungal
(74) *Attorney, Agent, or Firm* — Lee, Hong, Degerman, Kang & Waimey

(57) ABSTRACT

The present application discloses a method of transmitting and receiving a signal to and from an evolved Node B (eNB) by user equipment in a wireless communication system that supports carrier aggregation. In particular, the method is characterized by including the steps of: performing first carrier detection on a channel that is set for a predetermined (Continued)

frequency region of an unlicensed frequency band; performing second carrier detection on a sub channel when, as a result of the first carrier detection, the channel is in an IDLE state; and performing one of uplink signal transmission or downlink signal reception from the eNB on the sub channel when, as a result of the second carrier detection, the sub channel is in an IDLE state.

19 Claims, 15 Drawing Sheets

(51) Int. Cl.
*H04B 17/318* (2015.01)
*H04W 16/14* (2009.01)
*H04W 84/04* (2009.01)
*H04W 84/12* (2009.01)

(52) U.S. Cl.
CPC ............ *H04W 72/04* (2013.01); *H04W 74/08* (2013.01); *H04W 84/042* (2013.01); *H04W 84/12* (2013.01)

(56) References Cited

U.S. PATENT DOCUMENTS

| | | | |
|---|---|---|---|
| 2014/0112289 A1* | 4/2014 | Kim | H04W 16/14 370/329 |
| 2017/0041947 A1* | 2/2017 | Kim | H04W 72/14 |
| 2017/0118784 A1* | 4/2017 | Chen | H04W 16/14 |

FOREIGN PATENT DOCUMENTS

| | | |
|---|---|---|
| KR | 1020140031203 | 3/2014 |
| WO | 2010117232 | 10/2010 |
| WO | 2010140803 | 12/2010 |
| WO | 2012064502 | 5/2012 |

OTHER PUBLICATIONS

European Patent Office Application Serial No. 15841698.2, Search Report dated Mar. 22, 2018, 8 pages.

* cited by examiner

FIG. 5
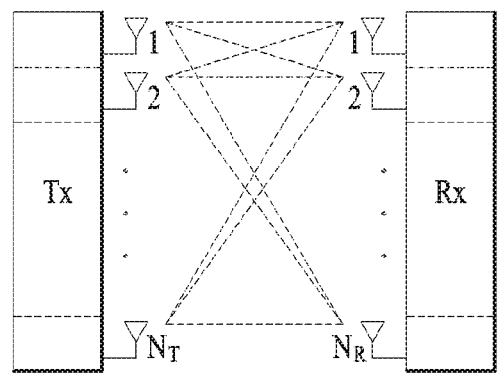
(a)
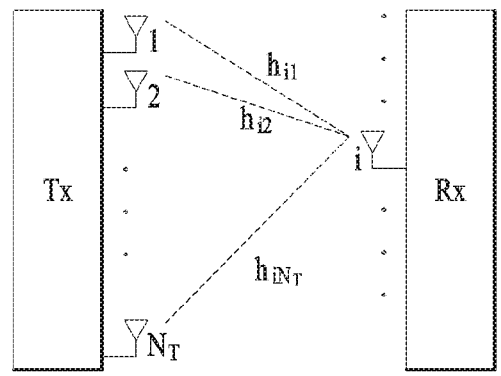
(b)

METHOD AND DEVICE FOR TRANSMITTING AND RECEIVING SIGNAL TO AND FROM ENB BY USER EQUIPMENT IN WIRELESS COMMUNICATION SYSTEM THAT SUPPORTS CARRIER AGGREGATION

CROSS-REFERENCE TO RELATED APPLICATIONS

This application is the National Stage filing under 35 U.S.C. 371 of International Application No. PCT/KR2015/009733, filed on Sep. 16, 2015, which claims the benefit of U.S. Provisional Application No. 62/052,443, filed on Sep. 18, 2014, the contents of which are all hereby incorporated by reference herein in its entirety.

TECHNICAL FIELD

The following description relates to a wireless communication system, and more particularly, to a method of transmitting and receiving a signal in a wireless communication system supporting carrier aggregation and an apparatus therefor.

BACKGROUND ART

Multiple-Input Multiple-Output (MIMO) technology is a technology for improving efficiency of data transmission and reception using multiple transmit antennas and multiple receive antennas rather than using one transmit antenna and one receive antenna. If a single antenna is used, a receive entity receives data through a single antenna path. In contrast, if multiple antennas are used, the receive entity receives data through several paths, accordingly data transmission rate and throughput may be improved, and the coverage may be extended.

To increase multiplexing gain of the MIMO operation, an MIMO transmit entity may use channel state information (CSI) fed back by the MIMO receive entity. The receive entity may determine the CSI by performing channel measurement using a predetermined reference signal (RS) from the transmit entity.

DISCLOSURE OF THE INVENTION

Technical Tasks

One object of the present invention is to provide a method of efficiently transmitting and receiving a signal in a wireless communication system supporting carrier aggregation.

Another object of the present invention is to provide a method of efficiently transmitting and receiving a signal using carrier sensing (CS).

The other object of the present invention is to provide a method of efficiently transmitting and receiving a signal using carrier sensing (CS).

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting and receiving a signal, which is transmitted and received by a user equipment with a base station in a wireless communication system supporting a carrier aggregation scheme, includes the steps of performing first carrier sensing on a channel configured for a prescribed frequency region of an unlicensed frequency band, if the channel is in an idle state as a result of the first carrier sensing, performing second carrier sensing on a subchannel, and if the subchannel is in an idle state as a result of the second carrier sensing, performing either uplink signal transmission from the base station or downlink signal reception on the subchannel.

To further achieve these and other advantages and in accordance with the purpose of the present invention, according to a different embodiment, a method of transmitting and receiving a signal, which is transmitted and received by a base station with a user equipment in a wireless communication system supporting a carrier aggregation scheme, includes the steps of performing first carrier sensing on a channel configured for a prescribed frequency region of an unlicensed frequency band, if the channel is in an idle state as a result of the first carrier sensing, performing second carrier sensing on a subchannel, and if the subchannel is in an idle state as a result of the second carrier sensing, performing either downlink signal transmission from the user equipment or uplink signal reception on the subchannel.

Following items can be commonly applied to the embodiments according to the present invention.

The first carrier sensing performing step can include the steps of measuring first reception power on the channel and comparing the measured reception power with a first threshold value predetermined for the first carrier sensing.

Preferably, the second carrier sensing performing step can include the steps of measuring second reception power on the second region and comparing the measured reception power with a second threshold value predetermined for the second carrier sensing.

The second carrier sensing performing step can further include the step of detecting a signal of a neighbor cell or a neighbor UE on the second region. In this case, the second reception power can be measured from the signal of the neighbor cell or the neighbor UE.

Or, the second carrier sensing performing step can be performed without detecting a signal of a neighbor base station or a neighbor UE.

If the second reception power is greater than the second threshold value, the subchannel is determined as being in a busy state and if the second reception power is less than the second threshold value, the subchannel is determined as being in an idle state.

The second threshold value for the subchannel is configured by a value smaller than the first threshold value for the channel.

The subchannel can be included in the channel. Or, the subchannel can be positioned at a band different from a band at which the channel is positioned.

The first threshold value can be configured by a value identical to a threshold value at the time of transmitting a signal rather than Wi-Fi among threshold values predetermined for a Wi-Fi system.

The wireless communication system may correspond to an LTE system or an LTE-A system.

To further achieve these and other advantages and in accordance with the purpose of the present invention, according to a further different embodiment, a user equipment supporting a carrier aggregation scheme includes a transceiving module and a processor, if first carrier sensing is performed on a channel configured for a prescribed frequency region of an unlicensed frequency band and the channel is in an idle state as a result of the first carrier sensing, configured to perform second carrier sensing on a subchannel, the processor, if the subchannel is in an idle state as a result of the second carrier sensing, configured to control the transceiving module to perform either uplink signal transmission from the base station or downlink signal reception on the subchannel.

To further achieve these and other advantages and in accordance with the purpose of the present invention, according to a further different embodiment, a base station supporting a carrier aggregation scheme includes a transceiving module and a processor, if first carrier sensing is performed on a channel configured for a prescribed frequency region of an unlicensed frequency band and the channel is in an idle state as a result of the first carrier sensing, configured to perform second carrier sensing on a subchannel, the processor, if the subchannel is in an idle state as a result of the second carrier sensing, configured to control the transceiving module to perform either downlink signal transmission from the user equipment or uplink signal reception on the subchannel.

It is to be understood that both the foregoing general description and the following detailed description are exemplary and explanatory and are intended to provide further explanation of the invention as claimed.

Advantageous Effects

According to the present invention, it is able to efficiently transmit and receive a signal in a wireless communication system supporting carrier aggregation.

Or, according to the present invention, it is able to efficiently transmit and receive a signal using channel sensing (CS).

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

BEST MODE

Mode for Invention

Figure 1:
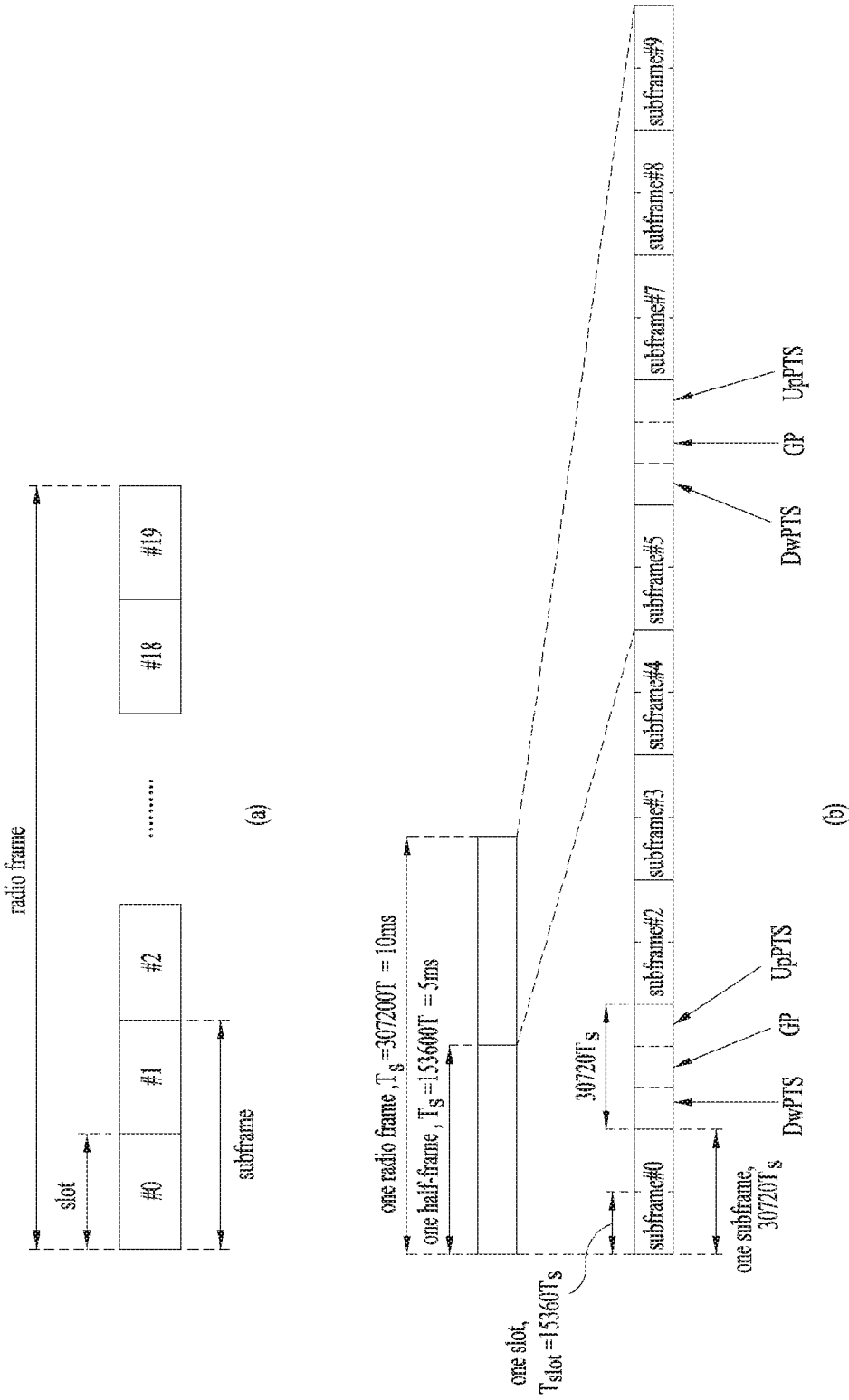
FIG. 1 is a diagram for explaining a structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point (AP)," "remote radio head (RRD)," "transmission point (TP)," and "reception point (RP)." The term "relay" may be replaced with terms such as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

FIG. 1 illustrates a radio frame structure.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which includes 5 subframes, a downlink pilot time slot (DwPTS), a guard period (GP), and an uplink pilot time slot (UpPTS). One subframe includes two slots. A subframe including a DwPTS, a GP and a UpPTS may be referred to as a special subframe. The DwPTS is used for initial cell search, synchronization, or channel estimation in a UE, whereas the UpPTS is used for channel estimation in an eNB and UL transmission synchronization in a UE. The GP is provided to eliminate interference on UL caused by multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
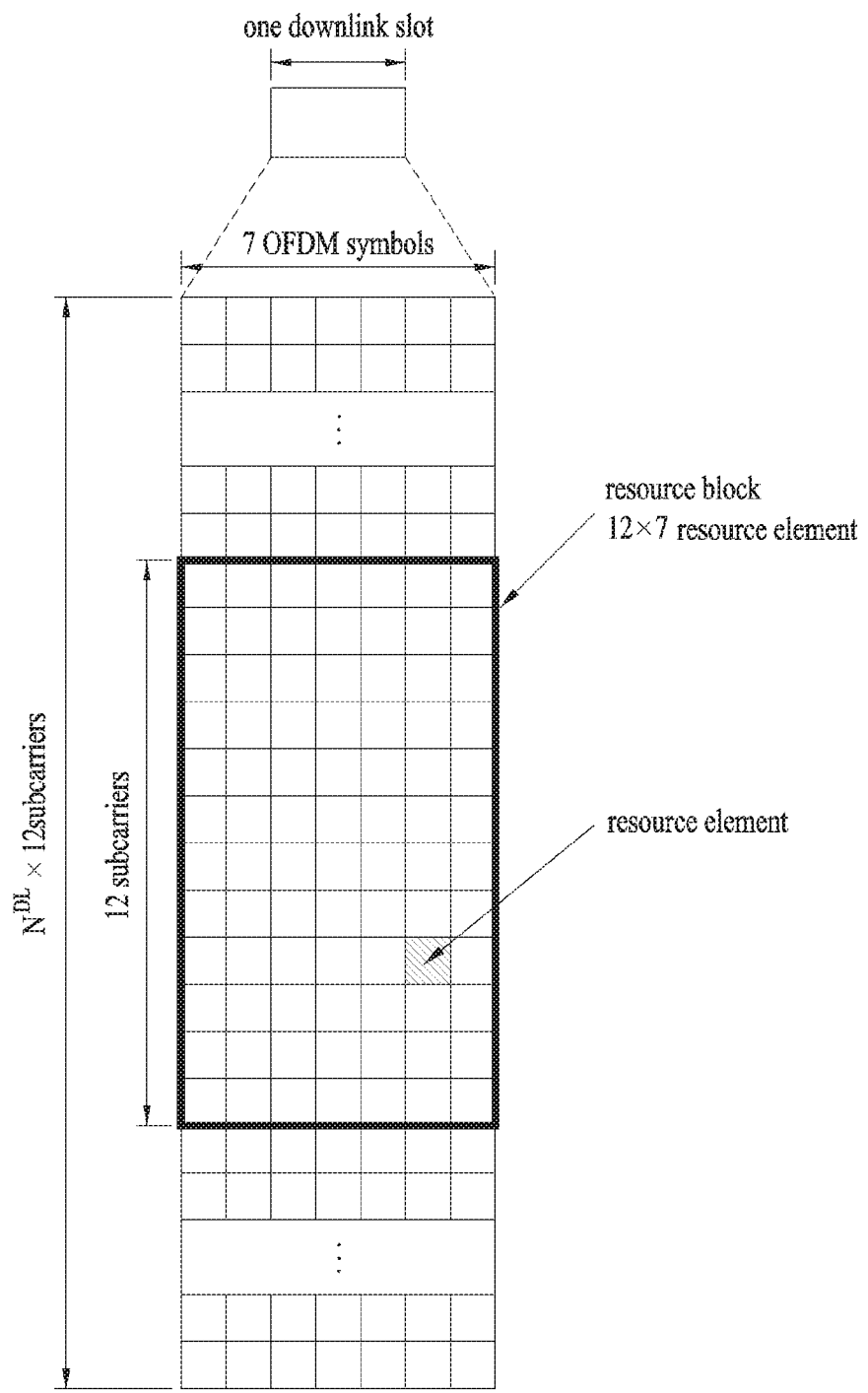
FIG. 2 is a diagram for a resource grid of a downlink slot.

FIG. 2 is a diagram illustrating a resource grid for one DL slot.

A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
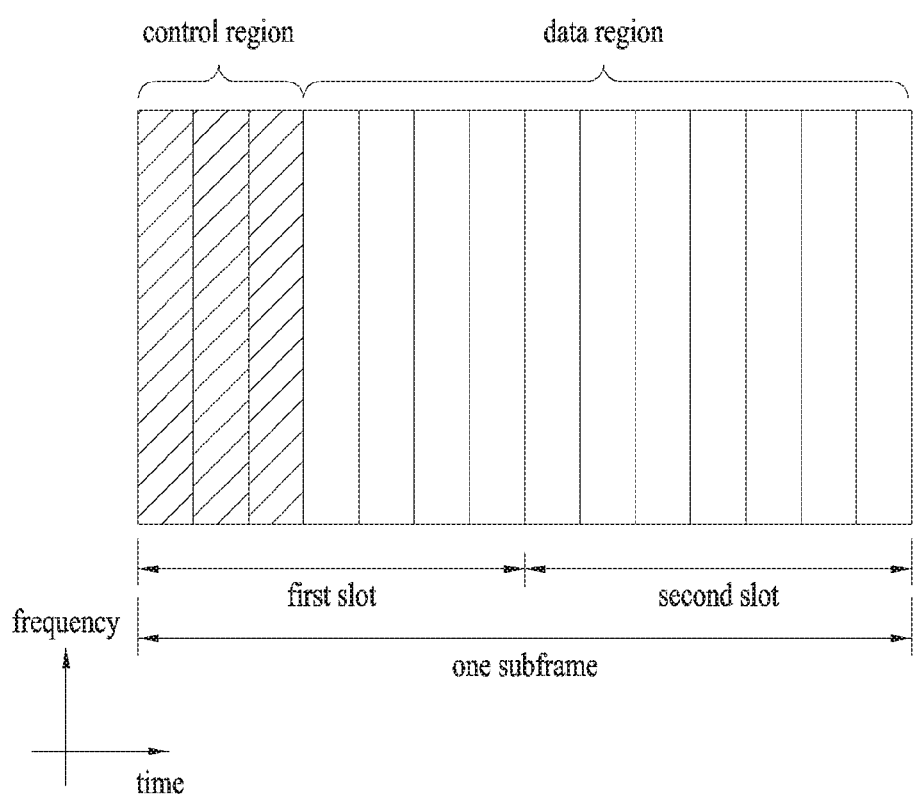
FIG. 3 is a diagram for a structure of a downlink subframe.

FIG. 3 illustrates a DL subframe structure.

Up to first three OFDM symbols of the first slot in a DL subframe correspond to a control region to which control channels are allocated and the other OFDM symbols of the DL subframe corresponds to a data region to which a physical downlink shared channel (PDSCH) is allocated.

DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmit power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control information, and voice over internet protocol (VoIP) activation information. A plurality of PDCCHs may be transmitted in the control region, and a UE may monitor PDCCHs.

A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs.

An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

PDCCH Processing

When PDCCH is mapped to a resource element, it may use a control channel element (CCE) which is a continuous logical allocation unit. One CCE includes a plurality of resource element groups (REGs) (e.g., 9) and one REG includes 4 REs adjacent to each other in a state that a reference signal (RS) is excluded.

The number of CCEs required for a specific PDCCH may vary according to a DCI payload corresponding to a size of control information, a cell bandwidth, a channel coding rate, and the like. Specifically, the number of CCEs required for the specific PDCCH can be defined according to a PDCCH format as shown in Table 1 in the following.

TABLE 1

| | Search space | | Number of PDCCH |
|---|---|---|---|
| | Aggregation level | Size (CCE unit) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One of four formats can be used for PDCCH and the format is not known to a UE. Hence, the UE performs decoding while not knowing the PDCCH format. This is referred to as blind decoding. Yet, if the UE performs decoding on all CCEs used in DL in response to each PDCCH format, it becomes huge burden on the UE. Hence, a search space is defined in consideration of a constraint on a scheduler and the number of decoding attempts.

In particular, a search space is a combination of candidate PDCCHs consisting of CCEs on which decoding is performed by a UE on an aggregation level. In this case, the aggregation level and the number of PDCCH candidates can be defined as Table 2 in the following.

TABLE 2

| | Search space | | Number of PDCCH |
|---|---|---|---|
| | Aggregation level | Size (CCE unit) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2, since there exist 4 aggregation levels, a UE may have a plurality of search spaces according to each aggregation level. And, as shown in Table 2, a search space can be classified into a UE-specific search space and a common search space. The UE-specific search space is used for specific UEs. A UE monitors (attempts to perform decoding on a combination of PDCCH candidates according to an available DCI format) the UE-specific search space and checks RNTI and CRC that mask PDCCH. If the RNTI and the CRC are valid, the UE is able to obtain control information.

The common search space is used when it is necessary for a plurality of UEs or all UEs to receive PDCCH to perform dynamic scheduling of system information or receive a paging message. Yet, the common search space can also be used for a specific UE in managing resources. And, the common search space can be overlapped with the UE-specific search space.

As mentioned in the foregoing description, a UE attempts to perform decoding on a search space. The number of decoding attempts is determined on the basis of a DCI format and a transmission mode which is determined via RRC (radio resource control) signaling. If carrier aggregation is not applied, since it is necessary for a UE to consider DCI size of two types (DCI format 0/1A/3/3A and DCI format 1C) for each of 6 PDCCH candidates, maximum 12 decoding attempts are required for the common search space. In case of a UE-specific search space, since it is necessary for a UE to consider DCI size of two types for the number of PDCCH candidates (6+6+2+2=16), maximum 32 decoding attempts are required for the UE-specific search space. Hence, if carrier aggregation is not applied, maximum 44 decoding attempts are required.

Enhanced Control Channel

As an example of an enhanced control channel, EPDCCH (enhanced PDCCH) is explained.

Control information included in the aforementioned DCI formats are mainly explained as being transmitted via PDCCH defined by LTE/LTE-A. Yet, the control information can be transmitted via a different downlink control channel (e.g., EPDCCH) rather than the PDCCH. The EPDCCH corresponds to a new form of a control channel on which scheduling assignment for a UE such as DCI is carried and it may introduce the EPDCCH to efficiently support ICIC (inter-cell interference coordination), CoMP, MU-MIMO, and the like.

The EPDCCH is different from the legacy PDCCH in that the EPDCCH is assigned to a time-frequency resource region (e.g., a data region of FIG. 3) except a region (e.g., a control region of FIG. 3) defined for PDCCH transmission in legacy LTE/LTE-A system (In the following, in order to distinguish the legacy PDCCH from the EPDCCH, the legacy PDCCH is referred to as a legacy PDCCH). For example, a resource element of the EPDCCH is mapped to OFDM symbols except first N number of OFDM symbols (e.g., N≤4) of a downlink subframe in time domain and is mapped to a set of semi-statically allocated resource blocks (RBs) in frequency domain.

Similar to a reason of introducing the EPDCCH, it may be able to define E-PHICH as a new control channel on which HARQ ACK/NACK information is carried in response to uplink transmission and it may be able to define E-PCFICH as a new control channel on which information on a resource region used for transmitting a downlink control channel is carried. The EPDCCH, the E-PHICH, and/or the E-PCFICH can be commonly referred to as an enhanced-control channel.

EREG can be used to define mapping of the enhanced-control channels mapped to a resource element. For example, 16 EREGs (i.e., EREG 0 to EREG 15) may exist at a physical resource block (PRB) pair. In a PRB, numbers ranging from 0 to 15 are assigned to the remaining REs except REs to which a DMRS (demodulation reference signal) is mapped. An order of assigning the numbers may firstly follow an ascending order of frequency and then follows an ascending order of time. For example, REs to which such a number as i is assigned form one EREG i.

The enhanced-control channel can be transmitted using one ECCE or an aggregation of a plurality of ECCEs (enhanced CCEs). Each ECCE can include one or a plurality of EREGs. For example, the number of EREGs per ECCE may correspond to 4 or 8 (in case of a subframe of a normal CP, 4).

Numbers ranging from 0 to $N_{ECCE}-1$ can be assigned to ECCEs capable of being used for the enhanced-control channel. For example, a value of $N_{ECCE}$ may correspond to 1, 2, 4, 8, 16, or 32.

The number of REs of a PRB pair configured to transmit the enhanced-control channel can be defined by the number of REs that satisfies the following conditions i), ii), and iii). i) The REs should be a part of 16 EREGs of a PRB pair, ii) The REs should not be used for CRS (cell-specific reference signal) or a CSI-RS (channel state information-reference signal), and iii) The REs should belong to an OFDM symbol equal to or greater than an index of an OFDM symbol at which the enhanced-control channel starts.

And, the enhanced-control channel can be mapped to REs using a localized scheme or a distributed scheme. The enhanced-control channel can be mapped to REs that satisfy the following conditions a) to d). a) The REs should be a part of EREG allocated for transmission, b) The REs should not be a part of a PRB pair used for transmitting a physical broadcast channel (PBCH) or a synchronization signal, c) The REs should not be used for a CRS or a CSI-RS for a specific UE, and d) The REs should belong to an OFDM symbol equal to or greater than an index of an OFDM symbol at which the enhanced-control channel starts.

The enhance-control channel can be assigned as follows. A base station can set one or a plurality of enhanced-control channel-PRB-sets to a UE through higher layer signaling. For example, in case of EPDCCH, the enhanced-control channel-PRB-set can be used for monitoring the EPDCCH.

And, cross interleaving may or may not be applied to RE mapping of the enhanced-control channel.

When the cross interleaving is not applied to the RE mapping of the enhanced-control channel, one enhanced-control channel can be mapped to a specific set of a resource block and the number of resource blocks constructing a set of resource blocks may correspond to an aggregation level 1, 2, 4, or 8. In this case, a different enhanced-control channel is not transmitted from the set of the resource blocks.

When the cross interleaving is applied to the RE mapping of the enhanced-control channel, a plurality of enhanced-control channels are multiplexed and interleaved together and are mapped to a resource block which is allocated to transmit the enhanced-control channel. In particular, it may be represented as a plurality of enhanced-control channels are mapped to a specific resource block set.

Figure 4:
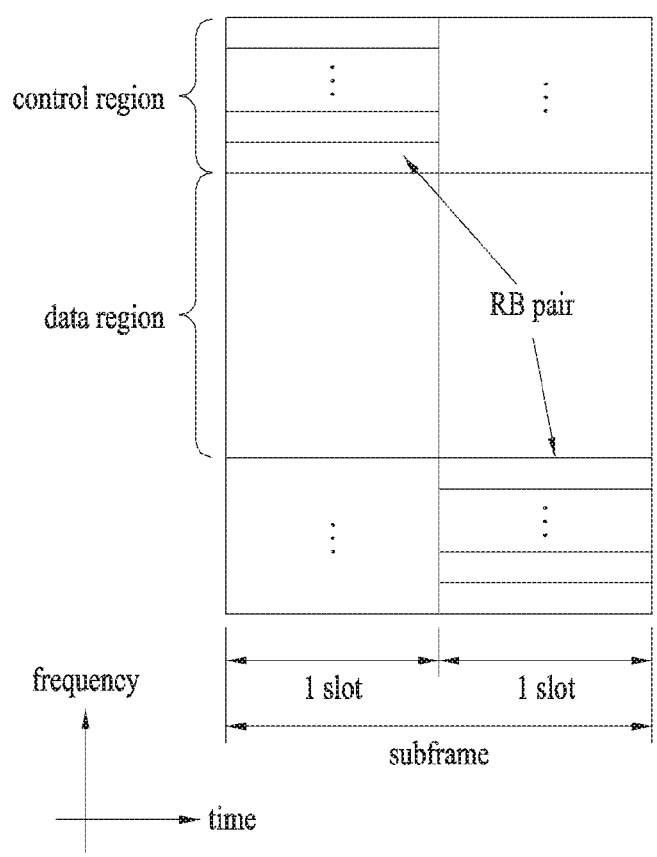
FIG. 4 is a diagram for a structure of an uplink subframe.

FIG. 4 is a diagram for a structure of an uplink subframe.

An uplink subframe can be divided into a control region and a data region in frequency domain. PUCCH (physical uplink control channel) including uplink control information is assigned to the control region. PUSCH (physical uplink shared channel) including user data is assigned to the data region. In order to maintain single carrier property, a UE does not transmit the PUCCH and the PUSCH at the same time. PUCCH for a UE is assigned to a resource block (RB) pair in a subframe. Resource blocks belonging to a resource block pair occupy a different subcarrier for two slots. This is referred to as a resource block pair allocated to PUCCH frequency hopped at a slot boundary.

Modeling of MIMO System

FIG. 5 illustrates configuration of a wireless communication system having multiple antennas.

Referring to FIG. 5(a), if the number of transmit (Tx) antennas increases to $N_T$, and the number of receive (Rx) antennas increases to $N_R$, a theoretical channel transmission capacity of the wireless communication system increases in proportion to the number of antennas, differently from a case in which only a transmitter or receiver uses multiple antennas, and accordingly transmission rate and frequency efficiency may be significantly increased. In this case, the transfer rate acquired by the increasing channel transmission capacity may theoretically increased by a predetermined amount that corresponds to multiplication of a maximum transfer rate $(R_o)$ acquired when one antenna is used by a rate of increase $(R_i)$. The rate of increase $(R_i)$ may be represented by the following Equation 1.

$$R_i = \min(N_T, N_R) \quad \text{[Equation 1]}$$

For example, provided that a MIMO system uses four Tx antennas and four Rx antennas, the MIMO system may theoretically acquire a high transfer rate which is four times that of a single antenna system. After the above-mentioned theoretical capacity increase of the MIMO system was demonstrated in the mid-1990s, many developers began to conduct intensive research into a variety of technologies which may substantially increase data transfer rate using the theoretical capacity increase. Some of the above technologies have been reflected in a variety of wireless communication standards such as, for example, third-generation mobile communication and next-generation wireless LAN.

A variety of MIMO-associated technologies have been intensively researched. For example, research into information theory associated with MIMO communication capacity under various channel environments or multiple access environments, research into a radio frequency (RF) channel measurement and modeling of the MIMO system, and research into space-time signal processing technology have been conducted.

Mathematical modeling of a communication method for use in the aforementioned MIMO system will hereinafter be described in detail. It is assumed that the system includes $N_T$ Tx antennas and $N_R$ Rx antennas.

In the case of a transmission signal, the maximum number of pieces of transmittable information is $N_T$ under the condition that $N_T$ Tx antennas are used, and the transmission information may be represented by the following equation.

$$s = [s_1, s_2, \ldots, s_{N_T}]^T \qquad \text{[Equation 2]}$$

Individual transmission pieces of information $s_1, s_2, \ldots, s_{N_T}$ may have different transmit powers. In this case, if the individual transmit powers are denoted by $P_1, P_2, \ldots, P_{N_T}$, transmission information having an adjusted transmit power may be represented by the following equation.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

$\hat{S}$ may be represented by the following equation using a diagonal matrix P of transmit powers.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

The information vector $\hat{S}$ having adjusted transmit powers is applied to a weight matrix W, and thus $N_T$ transmission signals $x_1, x_2, \ldots, x_{N_T}$ to be actually transmitted are configured. In this case, the weight matrix W serves to properly distribute transmission information to individual antennas according to transmission channel situations. The above-mentioned transmission signals $x_1, x_2, \ldots, x_{N_T}$ may be represented by the following equation using vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Here, $W_{ij}$ denotes a weight corresponding to the i-th Tx antenna and the j-th information. W is also called a precoding matrix.

When $N_R$ Rx antennas are used, received signals $y_1, y_2, \ldots, y_{N_R}$ of individual antennas may be represented by a vector shown in the following equation.

$$y = [y_1, y_2, \ldots, y_{N_R}]^T \qquad \text{[Equation 6]}$$

When channel modeling is executed in the MIMO communication system, individual channels may be distinguished from each other according to Tx/Rx antenna indexes. A specific channel from a Tx antenna j to an Rx antenna i is denoted by $h_{ij}$. Regarding $h_{ij}$, it should be noted that an Rx antenna index is located ahead of a Tx antenna index.

FIG. 5(b) shows channels from $N_T$ Tx antennas to Rx antenna i. The channels may be represented in the form of a vector or matrix. Referring to FIG. 5(b), the channels from the $N_T$ Tx antennas to the Rx antenna i may be represented by the following equation.

$$h_i^T = [h_{i1}, h_{i2}, \ldots, h_{iN_T}] \qquad \text{[Equation 7]}$$

All channels from the $N_T$ Tx antennas to $N_R$ Rx antennas may also be represented as the following.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \qquad \text{[Equation 8]}$$

Additive white Gaussian noise (AWGN) is added to an actual channel after application of channel matrix H. AWGN $n_1, n_2, \ldots, n_{N_R}$ added to each of $N_R$ Rx antennas may be represented by the following equation.

$$n = [n_1, n_2, \ldots, n_{N_R}]^T \qquad \text{[Equation 9]}$$

Reception signal calculated by the mathematical modeling described above may be represented by the following equation.

[Equation 10]

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

The number of rows and the number of columns of channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

A rank of a matrix is defined by a smaller number between the number of rows and the number of columns, in which the rows and the columns are independent of each other. Therefore, the matrix rank may not be higher than the number of rows or columns. The rank of the channel matrix H may be represented by the following equation.

$$\text{rank}(H) \le \min(N_T, N_R) \qquad \text{[Equation 11]}$$

The rank may be defined as the number of non-zero Eigen values when Eigen value decomposition is performed on the matrix. Similarly, the rank may be defined as the number of non-zero singular values when singular value decomposition is performed on the matrix. Accordingly, the rank of the channel matrix refers to a maximum number of pieces of information that may be transmitted on a given channel.

In this specification, "rank" with respect to MIMO transmission indicates the number of paths through which signals may be independently transmitted at specific time in a specific frequency resource and "the number of layers"

refers to the number of signal streams transmitted through each path. Since a transmitter transmits as many layers as the rank used in signal transmission, the rank corresponds to the number of layers unless otherwise mentioned.

Reference Signal (RS)

In transmitting packets in a wireless communication system, the packets are transmitted over a radio channel, and therefore signal distortion may occur in the transmission process. For a receive entity to receive the correct signal in spite of signal distortion, the received distorted signal should be corrected using channel information. In detecting the channel information, a signal which is known to both the transmit entity and the receive entity is usually transmitted and the degree of distortion of the signal received over the channel is used to detect the channel information. This signal is referred to as a pilot signal or a reference signal.

When data is transmitted and received using multiple antennas, channel state between each Tx antenna and each Rx antenna needs to be recognized in order to receive a correct signal. Accordingly, a separate reference signal needs to be present per Tx antenna.

The RSs may be broadly divided into two types according to the purposes thereof. One type is used to acquire channel information and the other type is used for data demodulation. Since the former RS is used to allow the UE to acquire DL channel information, this RS should be transmitted over a wide band, and even a UE which does not receive DL data in a specific subframe should be receive and measure the RS. Such RS is also used for measurement of, for example, handover. The latter RS is sent when an eNB sends a resource on downlink. The UE may perform channel measurement by receiving this RS, thereby implementing data modulation. This RS should be transmitted in a region in which data is transmitted.

Legacy 3GPP LTE systems (e.g., 3GPP LTE Release-8) define two types of downlink RSs for the unicast service. One is a common RS (CRS), and the other is a dedicated RS (DRS). The CRS is used for acquisition of information about the channel state and measurement of, for example, handover, and may be referred to as a cell-specific RS. The DRS is used for data demodulation, and may be referred to as a UE-specific RS. In the legacy 3GPP LTE systems, the DRS may be used only for data demodulation, and the CRS may be used for both acquisition of channel information and data demodulation.

The CRS is transmitted cell-specifically in every subframe in a wideband. The CRS may be transmitted with respect to up to four antenna ports depending on the number of Tx antennas of the eNB. For example, if the number of Tx antennas of the eNB is 2, CRSs for antenna ports #0 and #1 are transmitted. If the number of Tx antennas of the eNB is 4, CRSs for antenna ports #0 to #3 are respectively transmitted.

Figure 6:
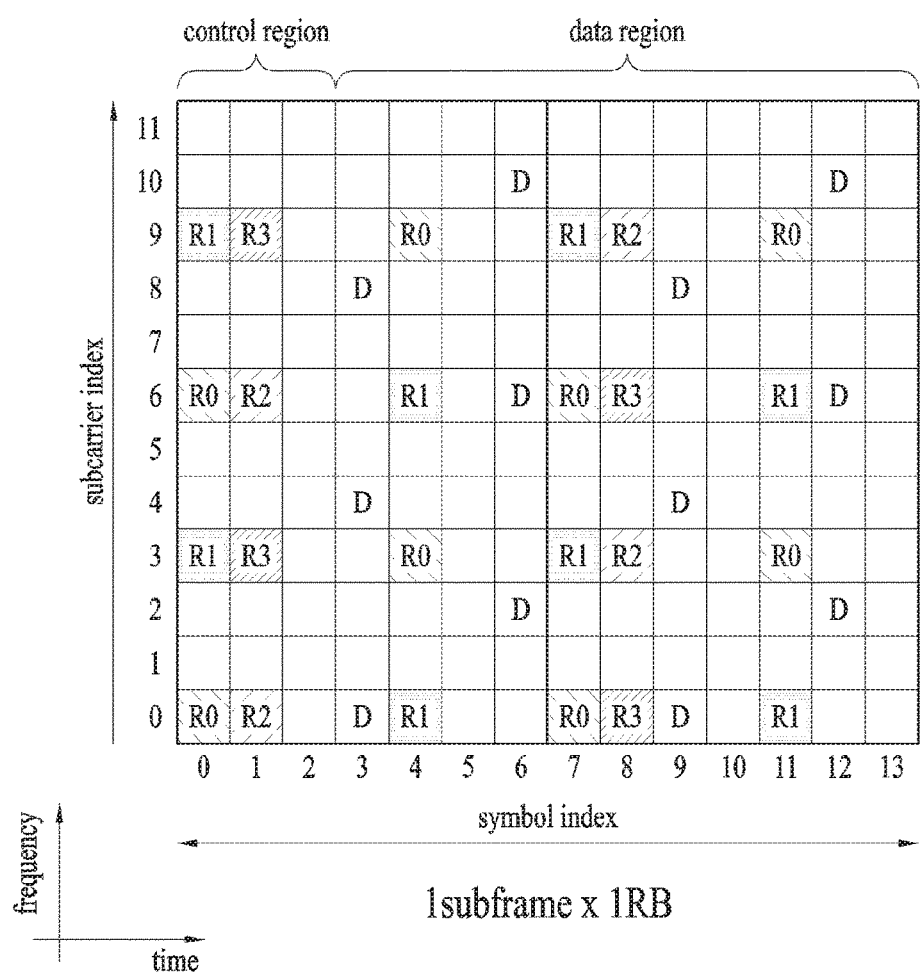
FIG. 6 is a diagram for exemplary patterns of a CRS and a DRS in a resource block pair.

FIG. 6 illustrates an exemplary pattern of a CRS and a DRS on one RB pair.

Referring to FIG. 6, the pattern of the CRS and the DRS is presented on one RB pair (14 OFDM symbols in the time domain×12 subcarriers in the frequency domain in the case of normal CP) in a system in which the eNB supports four transmit antennas. In FIG. 6, resource elements (REs) denoted by "R0", "R1", "R2" and "R3" represent the locations of the CRSs for antenna port indexes 0, 1, 2 and 3, respectively. In FIG. 6, REs denoted by "D" represent the locations of DRSs.

LTE-A, which is an advanced version of LTE, can supports up to 8 Tx antennas on downlink. Accordingly, RSs for up to 8 Tx antennas need to be supported in LTE-A. In LTE, downlink RSs are defined only for up to 4 antenna ports. Therefore, if an eNB has 4 to 8 DL Tx antennas in LTE-A, RSs for these antenna ports need to be additionally defined. As the RSs for up to 8 Tx antenna ports, both the RS for channel measurement and the RS for data demodulation need to be considered.

One important consideration in designing an LTE-A system is backward compatibility. Backward compatibility refers to supporting the legacy LTE UE such that the legacy LTE UE normally operates in the LTE-A system. In terms of RS transmission, if RSs for up to 8 Tx antennas are added to a time-frequency region in which a CRS defined in the LTE standard is transmitted in every subframe over the full band, RS overhead excessively increases. Accordingly, in designing new RSs for up to 8 antenna ports, reducing RS overhead needs to be considered.

The new RSs introduced in LTE-A may be classified into two types. One is a channel state information-RS (CSI-RS) intended for channel measurement for selecting a transmission rank, a modulation and coding scheme (MCS), a precoding matrix index (PMI), and the like, and the other is a demodulation RS (DMRS) intended for demodulation of data transmitted through up to 8 Tx antennas.

The CSI-RS intended for channel measurement is designed only for channel measurement, unlike the existing CRS, which is used for data demodulation as well as for channel measurement and handover measurement. Of course, the CSI-RS may also be used for handover measurement. Since the CSI-RS is transmitted only in order to obtain information about channel states, the CSI-RS need not be transmitted in every subframe, unlike the CRS for the legacy LTE system. Accordingly, to reduce overhead of the CSI-RS, the CSI-RS may be designed to be intermittently (e.g., periodically) transmitted in the time domain.

When data is transmitted in a certain DL subframe, a dedicated DMRS is transmitted to a UE for which the data transmission is scheduled. That is, the DMRS may be referred to as a UE-specific RS. A DMRS dedicated to a specific UE may be designed to be transmitted only in a resource region in which the UE is scheduled, i.e., the time-frequency region in which data for the UE is transmitted.

Figure 7:
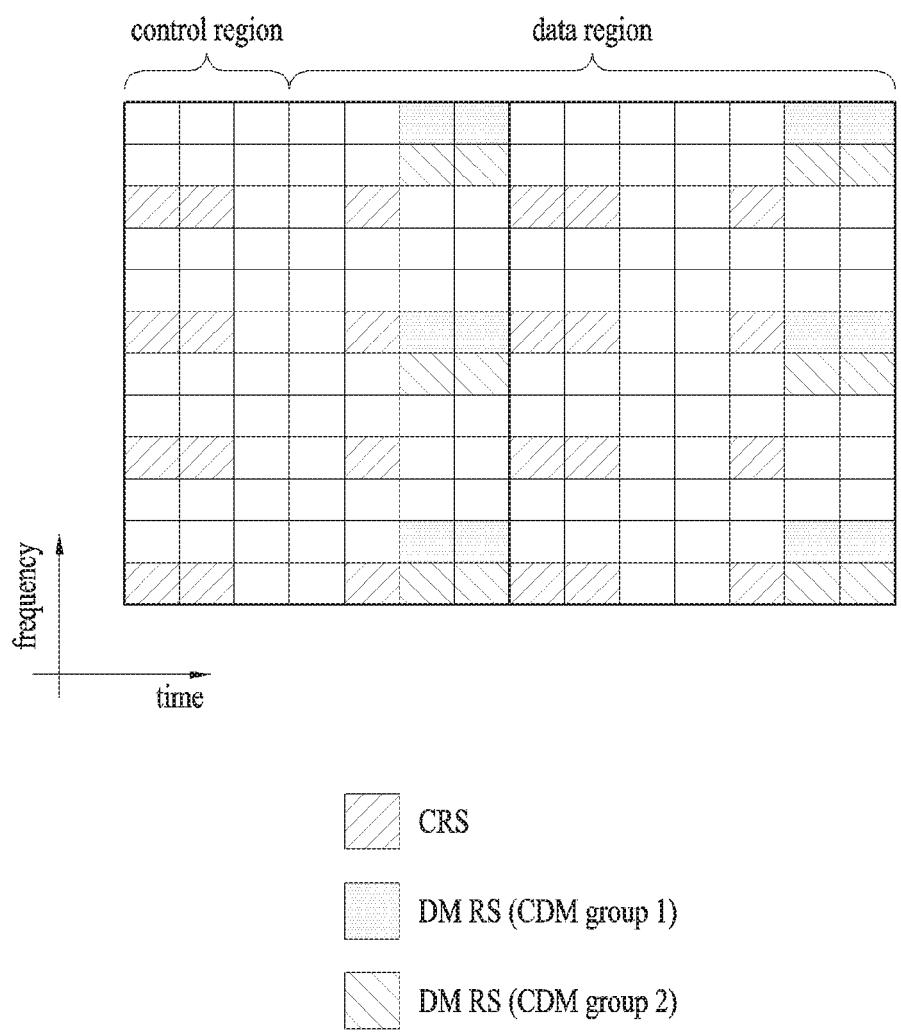
FIG. 7 is a diagram for an example of a DMRS pattern.

FIG. 7 illustrates an exemplary DMRS pattern defined in LTE-A.

FIG. 7 shows positions of REs for transmission of DMRSs on one RB pair (14 OFDM symbols in the time domain×12 subcarriers in the frequency domain in the case of normal CP) on which downlink data is transmitted. The DMRS may be transmitted with respect to four antenna ports (antenna port indexes 7, 8, 9 and 10) which are additionally defined in LTE-A. DMRSs for different antenna ports may be distinguished from each other as they are positioned on different frequency resources (subcarriers) and/or different time resources (OFDM symbols) (namely, they may be multiplexed using FDM and/or TDM). DMRSs for different antenna ports positioned on the same time-frequency resource may be distinguished from each other by an orthogonal code (namely, they may be multiplexed using the CDM scheme). In the example of FIG. 7, DMRSs for antenna ports 7 and 8 may be positioned on the REs indicated by DMRS CDM Group 1 and be multiplexed by an orthogonal code. Similarly, in the example of FIG. 7, DMRSs for antenna ports 9 and 10 may be positioned on the REs indicated by DMRS Group 2 and be multiplexed by the orthogonal code.

When the eNB transmits a DMRS, the precoding applied to data is applied to the DMRS. Accordingly, the channel information estimated by the UE using the DMRS (or UE-specific RS) is precoded channel information. The UE may easily perform data demodulation using the precoded channel information estimated through the DMRS. However, the UE does not know the information about the precoding applied to the DMRS, and accordingly the UE may not acquire, from the DMRS, channel information that is not precoded. The UE may acquire the channel information that is not precoded, using an RS separate from the DMRS, namely using the CSI-RS mentioned above.

Figure 8:
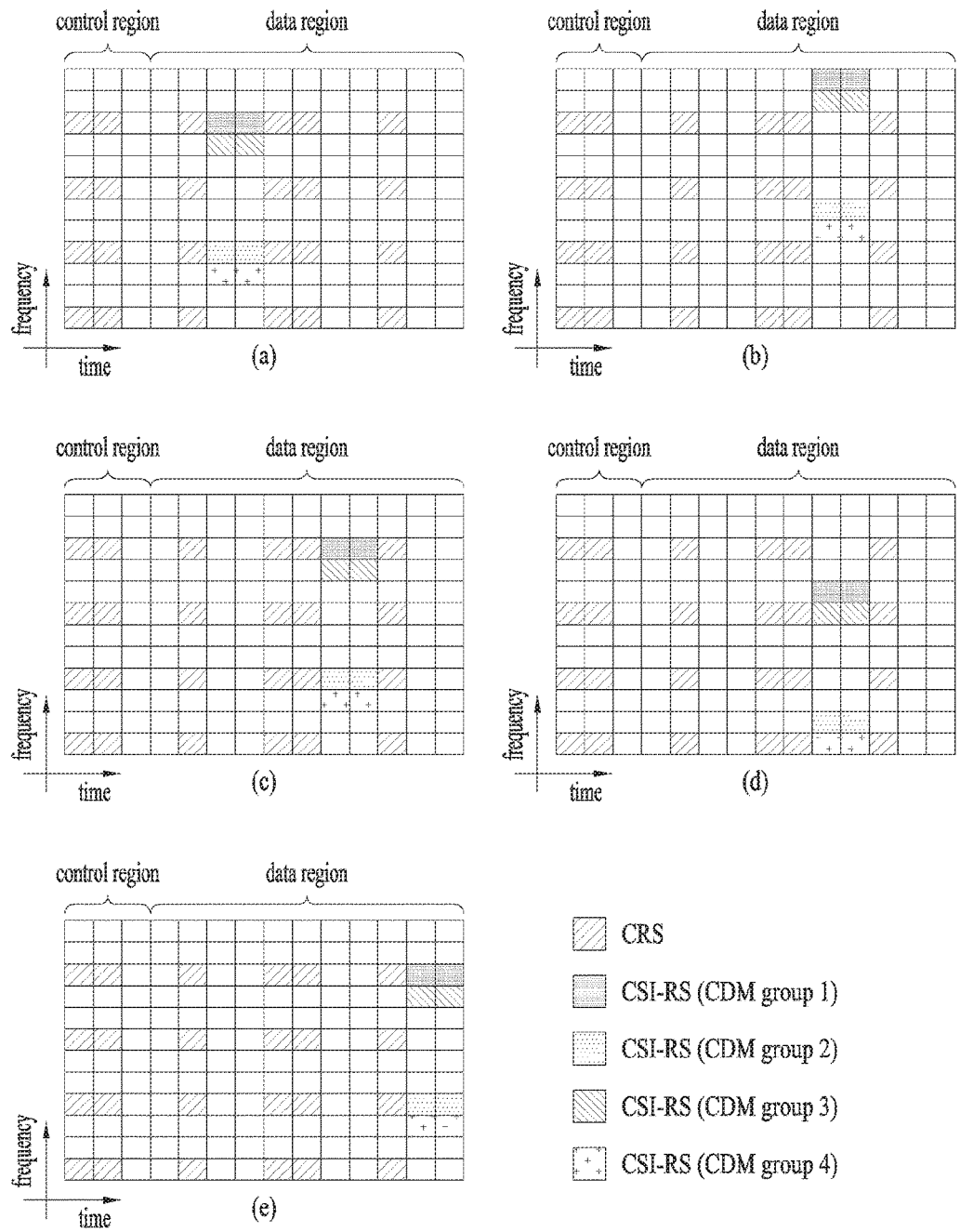
FIG. 8 is a diagram for examples of a CSI-RS pattern.

FIG. 8 is a diagram illustrating exemplary CSI-RS patterns defined in LTE-A.

FIG. 8 shows positions of REs for transmission of CSI-RSs on one RB pair (14 OFDM symbols in the time domain×12 subcarriers in the frequency domain in the case of normal CP) on which downlink data is transmitted. One of CSI-RS patterns shown in FIGS. 8(a) to 8(e) may be used in a DL subframe. CSI-RSs may be transmitted with respect to 8 antenna ports (antenna port indexes 15, 16, 17, 18, 19, 20, 21 and 22) which are additionally defined in LTE-A. CSI-RSs for different antenna ports may be distinguished from each other as they are positioned on different frequency resources (subcarriers) and/or different time resources (OFDM symbols) (namely, they may be multiplexed using FDM and/or TDM). CSI-RSs for different antenna ports positioned on the same time-frequency resource may be distinguished from each other by an orthogonal code (namely, they may be multiplexed using CDM). In the example of FIG. 8(a), CSI-RSs for antenna ports 15 and 16 may be positioned on the REs indicated by CSI-RS CDM Group 1 and be multiplexed by an orthogonal code. In the example of FIG. 8(a), CSI-RSs for antenna ports 17 and 18 may be positioned on the REs indicated by CSI-RS CDM Group 2 and be multiplexed by the orthogonal code. CSI-RSs for antenna ports 19 and 20 may be positioned on the REs indicated by CSI-RS CDM Group 3 and be multiplexed by the orthogonal code. In the example of FIG. 8(a), CSI-RSs for antenna ports 21 and 22 may be positioned on the REs indicated by CSI-RS CDM Group 4 and multiplexed by the orthogonal code. The principle described above with reference to FIG. 8(a) may also be applied to FIGS. 8(b) to 8(e).

The RS patterns of FIGS. 6 to 8 are simply illustrative, and embodiments of the present invention are not limited to specific RS patterns. In other words, the embodiments of the present invention may be applied in the same manner when an RS pattern different from those of FIGS. 6 to 8 is defined and used.

CSI-RS Configuration

As described above, in the LTE-A system supporting up to 8 Tx antennas on downlink, an eNB needs to transmit CSI-RSs for all antenna ports. Since transmitting CSI-RSs for a maximum of 8 Tx antenna ports in every subframe excessively increases overhead, the CSI-RS may need to be intermittently transmitted in the time domain to reduce overhead, rather than being transmitted in every subframe. Accordingly, the CSI-RS may be periodically transmitted with a periodicity corresponding to an integer multiple of one subframe or transmitted in a specific transmission pattern.

Here, the periodicity or pattern in which the CSI-RS is transmitted may be configured by a network (e.g., an eNB). To perform CSI-RS-based measurement, the UE should be aware of a CSI-RS configuration for each CSI-RS antenna port of a cell (or a TP) to which the UE belongs. The CSI-RS configuration may include the index of a downlink subframe in which a CSI-RS is transmitted, time-frequency positions (e.g., a CSI-RS pattern as shown in FIGS. 8(a) to 8(e)) of CSI-RS REs in a transmission subframe, and a CSI-RS sequence (which is a sequence intended for CSI-RS and pseudo-randomly generated based on the slot number, cell ID, CP length and the like according to a predetermined rule). That is, a given eNB may use a plurality of CSI-RS configurations, and inform of CSI-RS configurations to be used for UE(s) in a cell among the CSI-RS configurations.

The plurality of CSI-RS configurations may or may not include a CSI-RS configuration for which the UE assumes that the transmit power of the CSI-RS is non-zero power. In addition, the plurality of CSI-RS configurations may or may not include at least one CSI-RS configuration for which the UE assumes that the transmit power of the CSI-RS is zero transmit power.

Further, each bit of a parameter (e.g., a 16-bit bitmap ZeroPowerCSI-RS parameter) for a CSI-RS configuration of zero transmit power may be caused by a higher layer to correspond to the CSI-RS configuration (or REs to which CSI-RSs can be allocated according to the CSI-RS configuration), and the UE may assume that the transmit power on the CSI-RS REs of a CSI-RS configuration corresponding to a bit set to 1 in the parameter is 0.

Since CSI-RSs for the respective antenna ports need to be distinguished from each other, resources on which the CSI-RSs for the antenna ports are transmitted need to be orthogonal to each other. As described above in relation to FIG. 8, the CSI-RSs for the antenna ports may be multiplexed using FDM, TDM and/or CDM using orthogonal frequency resources, orthogonal time resources and/or orthogonal code resources.

When the eNB informs a UE belonging to a cell thereof of information about CSI-RSs, the eNB needs to signal information about time and frequency to which a CSI-RS for each antenna port is mapped. Specifically, the information about time may include the subframe numbers of subframes in which the CSI-RS is transmitted, a CSI-RS transmission periodicity for transmission of the CSI-RS, a subframe offset for transmission of the CSI-RS, and a number corresponding to an OFDM symbol on which a CSI-RS RE of a specific antenna is transmitted. The information about frequency may include spacing of frequencies at which a CSI-RS RE of a specific antenna is transmitted, and an RE offset or a shift value in the frequency domain.

Figure 9:
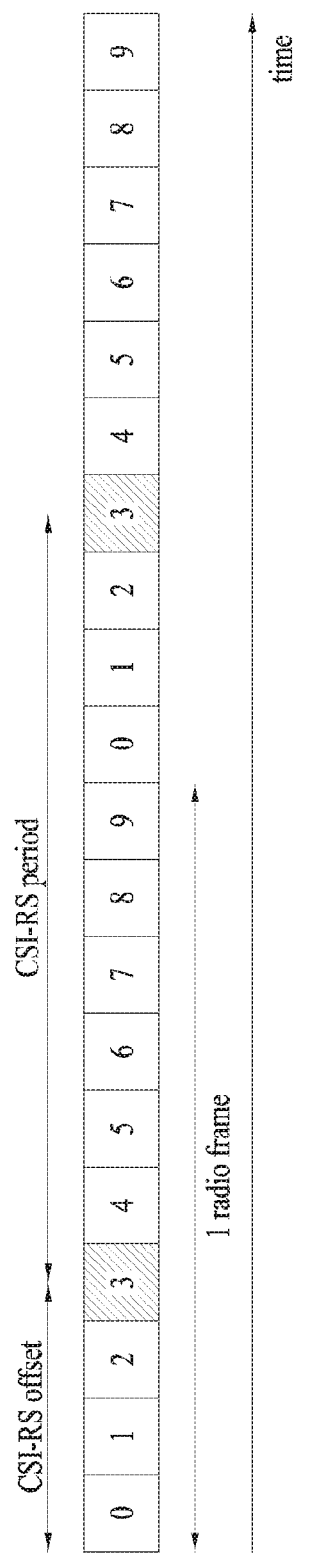
FIG. 9 is a diagram for explaining an example of a method of periodically transmitting a CSI-RS.

FIG. 9 is a diagram illustrating an exemplary scheme in which a CSI-RS is periodically transmitted.

The CSI-RS may be periodically transmitted with a periodicity corresponding to an integer multiple of one subframe (e.g., 5 subframes, 10 subframes, 20 subframes, 40 subframes, or 80 subframes)

FIG. 9 illustrates a case in which one radio frame consists of 10 subframes (from subframe 0 to subframe 9). In the example illustrated in FIG. 9, the transmission periodicity of the CSI-RS of the eNB is 10 ms (i.e., 10 subframes), and the CSI-RS transmission offset is 3. Different offset values may be assigned to eNBs such that CSI-RSs of several cells are uniformly distributed in the time domain. When the CSI-RS is transmitted with a periodicity of 10 ms, the offset may be set to a value between 0 and 9. Similarly, when the CSI-RS is transmitted with a periodicity of, for example, 5 ms, the offset may be set to a value between 0 and 4. When the CSI-RS is transmitted with a periodicity of 20 ms, the offset may be set to a value between 0 and 19. When the CSI-RS is transmitted with a periodicity of 40 ms, the offset may be set to a value between 0 and 39. When the CSI-RS is transmitted with a periodicity of 80 ms, the offset may be set to a value between 0 and 79. The offset value indicates the value of a subframe in which an eNB transmitting the CSI-RS with a predetermined periodicity starts CSI-RS transmission. When the eNB informs the UE of the transmission periodicity and the offset value of the CSI-RS, the UE may receive the CSI-RS of the eNB at the corresponding subframe position, using the values. The UE may measure a channel through the received CSI-RS, and report information such as CQI, PMI and/or rank indicator (RI) to the eNB as a result of the measurement. The CQI, the PMI and the RI may be collectively referred to as CQI (or CSI) throughout the specification unless they are separately described. The aforementioned information related to the CSI-RS is cell-specific information and may be applied to the UEs in a cell in common. The CSI-RS transmission periodicity and offset may be separately specified for each CSI-RS configuration. For example, a separate CSI-RS transmission periodicity and offset may be set for a CSI-RS configuration representing a CSI-RS transmitted with zero transmit power and a CSI-RS configuration representing a CSI-RS transmitted with non-zero transmit power.

Contrary to the CRS transmitted in all subframes in which a PDSCH can be transmitted, the CSI-RS may be configured to be transmitted only in some subframes. For example, CSI subframe sets $C_{CSI,0}$ and $C_{CSI,1}$ may be configured by a higher layer. CSI reference resource (i.e., a predetermined resource region forming the basis of CSI calculation) may belong to either $C_{CSI,0}$ or $C_{CSI,1}$, may not belong to both $C_{CSI,0}$ and $C_{CSI,1}$ at the same time. Accordingly, when CSI subframe sets $C_{CSI,0}$ and $C_{CSI,1}$ are configured by a higher layer, the UE is not allowed to expect that it will receive a trigger (or an indication for CSI calculation) for a CSI reference resource which is present in a subframe which belongs to none of the CSI subframe sets.

Alternatively, the CSI reference resource may be configured in a valid downlink subframe. The valid downlink subframe may be configured as a subframe satisfying various conditions. In the case of periodic CSI reporting, one of the conditions may be a subframe belonging to a CSI subframe set that is linked to periodic CSI reporting when a CSI subframe set is configured for the UE.

The UE may derive a CQI index from the CSI reference resource in consideration of the following assumptions (For details, see 3GPP TS 36.213).

First three OFDM symbols in a subframe are occupied by control signaling.

No REs are used by a primary synchronization signal, a secondary synchronization signal, or a physical broadcast channel (PBCH).

CP length of a non-Multicast Broadcast Single Frequency Network (MBSFN) subframe.

Redundancy version is 0.

If a CSI-RS is used for channel measurement, the ratio of PDSCH energy per resource element (EPRE) to CSI-RS EPRE conforms to a predetermined rule.

For CSI reporting in transmission mode 9 (i.e., the mode supporting up to 8-layer transmission), if the UE is configured for PMI/RI reporting, it is assumed that DMRS overhead corresponds to the most recently reported rank. For example, in the case of two or more antenna ports (i.e., rank less than or equal to 2) as described in FIG. 7, DMRS overhead on one RB pair is 12 REs, whereas DMRS overhead in the case of three or more antenna ports (i.e., rank greater than or equal to 3) is 24 REs. Therefore, a CQI index may be calculated on the assumption of DMRS overhead corresponding to the most recently reported rank value.

No REs are allocated to a CSI-RS and a zero-power CSI-RS.

No REs are allocated to a positioning RS (PRS).

The PDSCH transmission scheme conforms to a transmission mode currently set for the UE (the mode may be a default mode).

The ratio of PDSCH EPRE to cell-specific RS EPRE conforms to a predetermined rule.

The eNB may inform UEs of such a CSI-RS configuration through, for example, radio resource control (RRC) signaling. That is, information about the CSI-RS configuration may be provided to UEs in a cell using dedicated RRC signaling. For example, while a UE establishes a connection with the eNB through initial access or handover, the eNB may inform the UE of the CSI-RS configuration through RRC signaling. Alternatively, when the eNB transmits, to a UE, an RRC signaling message demanding channel state feedback based on CSI-RS measurement, the eNB may inform the UE of the CSI-RS configuration through the RRC signaling message.

Channel Status Information (CSI)

MIMO schemes may be classified into open-loop MIMO and closed-loop MIMO. In open-loop MIMO, a MIMO transmitter performs MIMO transmission without receiving CSI feedback from a MIMO receiver. In closed-loop MIMO, the MIMO transmitter receives CSI feedback from the MIMO receiver and then performs MIMO transmission. In closed-loop MIMO, each of the transmitter and the receiver may perform beamforming based on the CSI to achieve a multiplexing gain of MIMO Tx antennas. To allow the receiver (e.g., a UE) to feedback CSI, the transmitter (e.g., an eNB) may allocate a UL control channel or a UL-SCH to the receiver.

The UE may perform estimation and/or measurement of a downlink channel using a CRS and/or a CSI-RS. The CSI fed back to the eNB by the UE may include a rank indicator (RI), a precoding matrix indicator (PMI), and a channel quality indicator (CQI).

The RI is information about a channel rank. The channel rank represents the maximum number of layers (or streams) that can carry different pieces of information in the same time-frequency resources. Since the rank is determined mainly according to long-term fading of a channel, the RI may be fed back with a longer periodicity (namely, less frequently) than the PMI and the CQI.

The PMI is information about a precoding matrix used for transmission from a transmitter and has a value reflecting the spatial characteristics of a channel. Precoding refers to mapping transmission layers to Tx antennas. A layer-antenna mapping relationship may be determined by the precoding matrix. The PMI corresponds to an index of a precoding matrix of an eNB preferred by the UE based on a metric such as signal-to-interference-plus-noise ratio (SINR). In order to reduce the feedback overhead of precoding information, the transmitter and the receiver may pre-share a codebook including multiple precoding matrices, and only the index indicating a specific precoding matrix in the codebook may be fed back. For example, the PMI may be determined based on the most recently reported RI.

The CQI is information indicating channel quality or channel strength. The CQI may be expressed as a predetermined MCS combination. That is, a CQI index that is fed back indicates a corresponding modulation scheme and code rate. The CQI may configure a specific resource region (e.g., a region specified by a valid subframe and/or a physical RB) as a CQI reference resource and be calculated on the assumption that PDSCH transmission is present on the CQI reference resource, and the PDSCH can be received without exceeding a predetermined error probability (e.g., 0.1). Generally, the CQI has a value reflecting a received SINR which can be obtained when the eNB configures a spatial channel using a PMI. For instance, the CQI may be calculated based on the most recently reported RI and/or PMI.

In a system supporting an extended antenna configuration (e.g., an LTE-A system), additional acquisition of multi user (MU)-MIMO diversity using an MU-MIMO scheme is considered. In the MU-MIMO scheme, when an eNB performs downlink transmission using CSI fed back by one UE among multiple users, it is necessary to prevent interference with other UEs because there is an interference channel between UEs multiplexed in the antenna domain. Accordingly, CSI of higher accuracy than in a single-user (SU)-MIMO scheme should be fed back in order to correctly perform MU-MIMO operation.

A new CSI feedback scheme may be adopted by modifying the existing CSI including an RI, a PMI, and a CQI so as to measure and report more accurate CSI. For example, precoding information fed back by the receiver may be indicated by a combination of two PMIs (e.g., i1 and i2). Thereby, more precise PMI may be fed back, and more precise CQI may be calculated and reported based on such precise PMI.

Meanwhile, the CSI may be periodically transmitted over a PUCCH and or aperiodically transmitted over a PUSCH. For the RI, various reporting modes may be defined depending on which of a first PMI (e.g., W1), a second PMI (e.g., W2), and a CQI is fed back and whether the PMI and/or CQI that is fed back relates to a wideband (WB) or a subband (SB).

CQI Calculation

Hereinafter, CQI calculation will be described in detail on the assumption that the downlink receiver is a UE. However, the description of the present invention given below may also be applied to a relay station serving to perform downlink reception.

A description will be given below of a method for configuring/defining a resource (hereinafter, referred to as a reference resource) forming the basis of calculation of the CQI when the UE reports CSI. The CQI is more specifically defined below.

A CQI that the UE reports corresponds to a specific index value. The CQI index has a value indicating a modulation technique, code rate, and the like that correspond to the channel state. For example, CQI indexes and analyzed meanings thereof may be given as shown in Table 3 below.

TABLE 3

| CQI index | Modulation | Code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 1 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on an observation which is not restricted by time and frequency, the UE may determine the highest CQI index satisfying a predetermined requirement among CQI indexes 1 to 15 of Table 3 with respect to each CQI value reported in uplink subframe n. The predetermined requirement may be that a single PDSCH transmission block which has a combination of a modulation scheme (e.g., MCS) and a transmission block size (TBS) corresponding to the CQI index and occupies a group of downlink physical RBs called a CQI reference resource should be received with a transmission block error probability not exceeding 0.1 (i.e., 10%). If even CQI index 1 does not satisfy the aforementioned requirement, the UE may determine CQI index 0.

In transmission mode 9 (corresponding to transmission of up to 8 layers) and the feedback reporting mode, the UE may perform channel measurement for calculation of the CQI value reported in uplink subframe n based only on the CSI-RS. In the other transmission modes and corresponding reporting modes, the UE may perform channel measurement for CQI calculation based on the CRS.

If all requirements given below are satisfied, a combination of a modulation scheme and a TBS may correspond to one CQI index. That is, the combination should be allowed to be signaled on a PDSCH in a CQI reference resource according to an associated TRS table, the modulation scheme should be indicated by a corresponding CQI index, and when the combination of a TBS and a modulation scheme is applied to the reference resource, a valid channel code rate as close to the code rate indicated by the CQI index as possible should be given. If two or more combinations of a TBS and a modulation scheme are almost equal to the code rate indicated by the corresponding CQI index, a combination having the smallest TBS may be determined.

A CQI reference resource is defined as the following.

In the frequency domain, the CQI reference resource defined as a group of downlink physical RBs corresponds to a band associated with the derived CQI value.

In the time domain, the CQI reference resource is defined as a single downlink subframe n-nCQI_ref. In the case of periodic CQI reporting, nCQI_ref is determined to have a value that is smallest among the values greater than or equal to 4 and corresponds to a downlink subframe in which downlink subframe n-nCQI_ref is valid. In the case of aperiodic CQI reporting, a downlink subframe identical to a valid downlink subframe corresponding to a CQI request in an uplink DCI format (namely, the PDCCH DCI format for providing the UE with uplink scheduling control information) (or having a received CQI request) is determined as a CQI reference resource for nCQI_ref. In aperiodic CQI reporting, nCQI_ref may be 4, and downlink subframe n-nCQI_ref may correspond to a valid downlink subframe. Herein, downlink subframe n-nCQI_ref may be received after a subframe corresponding to a CQI request in a random access response grant (or having a received CQI request). The valid downlink subframe refers to a downlink subframe that is configured for the UE, is not set as a MBSFN subframe except in transmission mode 9, and neither includes a DwPTS field if the length of DwPTS is less than or equal to 7680*Ts (Ts=1/(15000×2048) seconds), nor belongs to a measurement gap configured for the UE. If there is no valid downlink subframe for the CQI reference resource, CQI reporting is not performed in uplink subframe n.

In the layer region, the CQI reference resource is defined as a RI and PMI which the CQI presumes.

The following assumptions may be made for the UE to derive a CQI index on a CQI reference resource: (1) the first three OFDM symbols in a downlink subframe are used for control signaling; (2) there is no RE that is used by a primary synchronization signal, a secondary synchronization signal, or a PBCH; (3) CP length of a non-MBSFN subframe is given; (4) Redundancy version is 0; (5) If a CSI-RS is used for channel measurement, the ratio of PDSCH energy per resource element (EPRE) to CSI-RS EPRE has a predetermined value signaled by a higher layer; (6) a PDSCH transmission scheme (single antenna port transmission, transmission diversity, spatial multiplexing, MU-MIMO, etc.) defined for each transmission mode (e.g., a default mode) is currently set for the UE; (7) if the CRS is used for channel measurement, the ratio of PDSCH EPRE to CRS EPRE may be determined according to a predetermined requirement. For details related to definition of the CQI, see 3GPP TS 36.213.

In summary, the downlink receiver (e.g., a UE) may configure a specific single subframe of the past as a CQI reference resource with respect to the current time at which it is performing CQI calculation, and when a PDSCH is transmitted from the eNB on the CQI reference resource, may calculate a CQI value such that a condition that the error probability should not exceed 10% is satisfied.

Sounding Reference Signal

A sounding reference signal (SRS) is transmitted via an SC-FDMA symbol positioned at the very last in a time axis of a subframe. SRSs of many UEs transmitted via the last SC-FDMA of an identical subframe can be distinguished from each other according to a frequency location/sequence. The SRS (sounding reference signal) is not associated with uplink data and/or control information transmission. The SRS is mainly used for evaluating channel quality to enable frequency-selective scheduling in UL. Yet, the SRS can also be used for a different purpose such as providing various functions to a recently not scheduled UE, enhancing power control, and the like. The SRS corresponds to a reference signal used for measuring an uplink channel and a pilot signal transmitted by each UE to a base station. The SRS is used by a base station to estimate a channel state between a UE and the base station. A channel on which the SRS is transmitted may have a transmission bandwidth and a transmission period different from each other according to each UE based on each UE status. The base station can determine a data channel of a UE to be scheduled based on a result of the channel estimation in every subframe.

The SRS can be used to estimate downlink channel quality under an assumption that a radio channel has a reciprocal relation between UL and DL. The assumption is valid in a time division duplex (TDD) system where UL and DL share an identical frequency domain and UL and DL are separated in time domain. A subframe in which an SRS is transmitted by a UE within a cell can be indicated by cell-specific broadcast signaling. A cell-specific 'srssubframeConfiguration' parameter of 4-bit long indicates 15 available subframe sets capable of transmitting the SRS in each radio frame. This configuration provides flexibility in controlling SRS overhead. As shown in FIG. 9, a UE can transmit an SRS via the last SC-FDMA symbol in a subframe.

Hence, the SRS and the data demodulation reference signal (DMRS) locate at a different SC-FDMA symbol in a subframe. Sounding reference signals of many UES transmitted via the last SC-FDMA can be distinguished from each other according to a frequency position. Since PUSCH data of a UE is not transmitted via an SC-FDMA symbol designed for the SRS, as a worst case, if each subframe has an SRS symbol, sounding overhead as much as 7% occurs. The SRS is generated by a CAZAC (constant amplitude zero auto correlation) sequence, and the like. Sounding reference signals transmitted from many UEs correspond to CAZAC sequence having a different cyclic shift value ($\alpha$).

As mentioned in the foregoing description, in case of 3GPP LTE Release 8/9, SRS transmission of a UE supports periodic SRS transmission only. By doing so, a base station can estimate uplink channel quality of each UE. In this case, a channel estimated by the base station is used for such a function as frequency dependent scheduling, link level adaptation, timing estimation, uplink power control, and the like. The base station can UE-specifically or cell-specifically transmit SRS uplink configuration to each UE via an SRS parameter using higher layer signaling (e.g., RRC signaling).

3GPP LTE Release 10 system supports aperiodic SRS transmission to perform uplink channel quality estimation and SRS resource utilization more adaptive and efficient compared to the legacy system. Discussion on a method of triggering the aperiodic SRS transmission is in progress. As an example, a base station may trigger the aperiodic SRS transmission via DL/UL grant in PDCCH. In particular, a base station may transmit a DL grant or an UL grant including an aperiodic SRS transmission triggering indicator that triggers the aperiodic SRS transmission of a UE. Or, the base station may define a new message format and transmit the format for the aperiodic SRS transmission.

Coordinated Multi-Point (CoMP)

To satisfy enhanced system performance requirements for the 3GPP LTE-A system, CoMP transmission and reception technology (also called co-MIMO, collaborative MIMO or network MIMO) has been proposed. CoMP technology may increase performance of UEs located at a cell edge and average sector throughput.

In a multi-cell environment with a frequency reuse factor set to 1, the performance of a UE located at a cell edge and average sector throughput may be lowered due to inter-cell interference (ICI). To attenuate ICI, the legacy LTE system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than using fewer frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one point (of a CoMP cooperation unit) at a time. That is, one point transmits data to a single UE at a given time point, while the other points in the CoMP cooperation unit do not transmit data to the UE at the time point. A point to transmit data to a UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination among cells of the CoMP cooperation units.

In the case of uplink, CoMP reception refers to reception of a signal transmitted through cooperation among a plurality of geographically separated points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination among the cells of the CoMP unit.

With a CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly give each eNB a command to perform the cooperative MIMO operation.

As noted from the above description, it can be said that the CoMP system operates as a virtual MIMO system by grouping a plurality of cells into one group. Basically, the CoMP system may adopt a MIMO communication scheme employing multiple antennas.

Carrier Aggregation

Before description is given of carrier aggregation, the concept of cell introduced to manage radio resources in LTE-A will be described first. A cell may be understood as a combination of downlink resources and uplink resources. Here, the uplink resource is not an essential element of the cell. Accordingly, a cell may include only downlink resources or include downlink resources and uplink resources. The downlink resource may be referred to as a downlink component carrier (DL CC), and the uplink resource may be referred to as an uplink component carrier (UL CC). The DL CC and the UL CC may be represented by carrier frequencies, and a carrier frequency represents a center frequency within the corresponding cell.

Cells may be divided into a primary cell (PCell), which operates at a primary frequency, and a secondary cell (SCell), which operates at a secondary frequency. The PCell and the SCell may be collectively referred to as a serving cell. A cell designated when the UE performs an initial connection establishment procedure or during a connection re-establishment procedure or a handover procedure, may serve as the PCell. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection, and SCell may be used for providing additional radio resources. In the carrier aggregation environment, all serving cells except the PCell may be viewed as SCells. In the case in which a UE is in an RRC_CONNECTED state but carrier aggregation is not established or in a case in which the UE does not support carrier aggregation, only a single serving cell consisting of PCells exists. On the other hand, in the case in which a UE is in the RRC_CONNECTED state and carrier aggregation is established therefor, one or more serving cells exist, and PCells and all SCells are included in all serving cells. For a UE supporting carrier aggregation, after an initial security activation procedure is initiated, the network may configure one or more SCells in addition to a PCell configured at the beginning of the connection establishment procedure.

Figure 10:
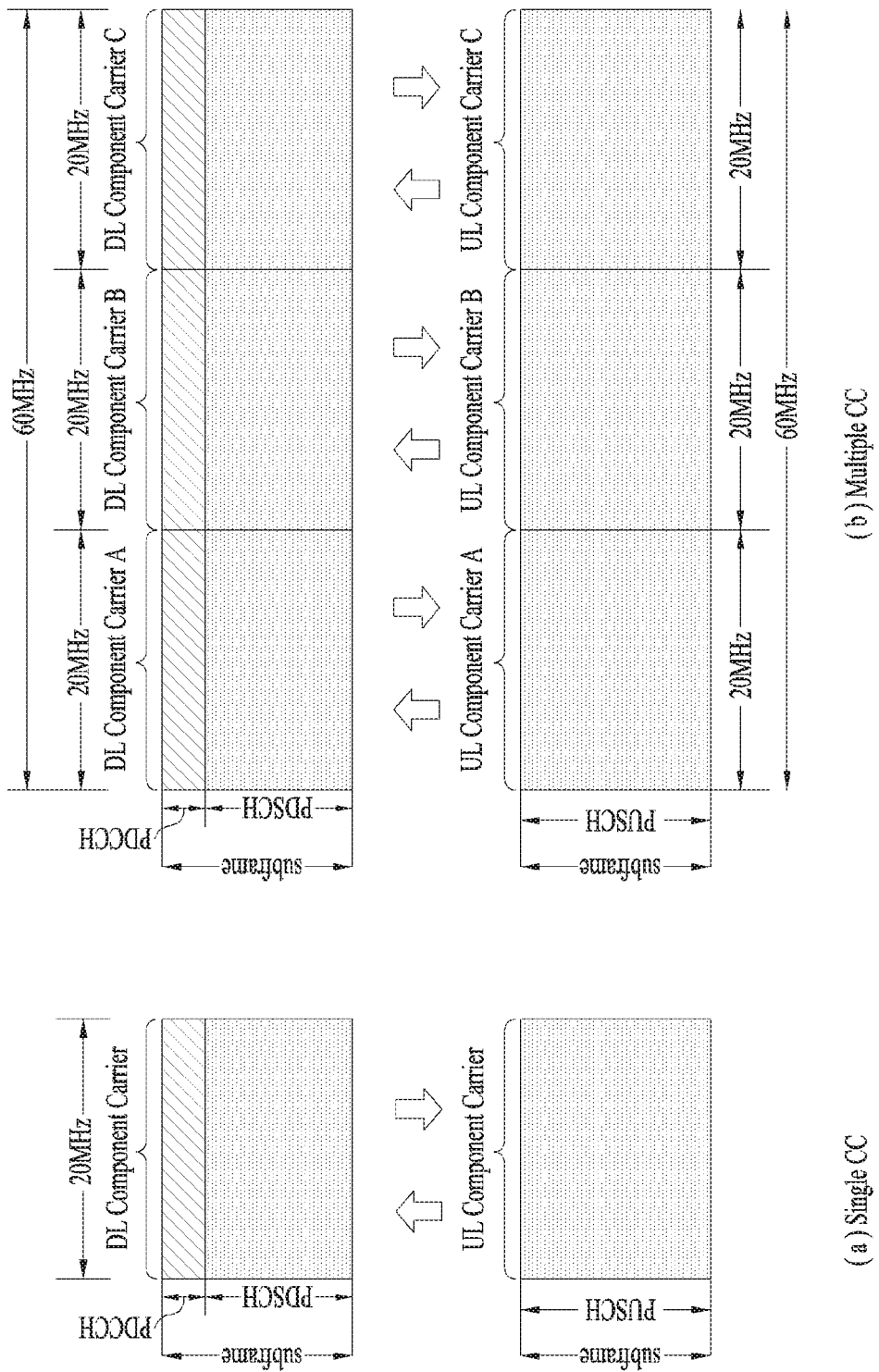
FIG. 10 is a diagram for explaining carrier aggregation.

FIG. 10 illustrates carrier aggregation.

Carrier aggregation is a technology that has been introduced to allow for use of a broader band in order to meet the requirements of a high-speed transmission rate. Carrier aggregation may be defined as an aggregation of two or more component carriers (CCs) having different carrier frequencies or an aggregation of two or more cells. Referring to FIG. 10, FIG. 10(a) illustrates a subframe in a case when one CC is used in the legacy LTE system, and FIG. 10(b) illustrates a subframe in a case where carrier aggregation is used. For example, in FIG. 10(b), 3 CCs of 20 MHz are used, thereby supporting a bandwidth of 60 MHz. Herein, CCs may be continuous or non-continuous in the frequency domain.

The UE may simultaneously receive and monitor downlink data from a plurality of DL CCs. A linkage between a DL CC and a UL CC may be indicated by the system information. The DL CC/UL CC link may be fixed in the system or may be semi-statically configured. Additionally, even if the entire system band consists of N CCs, the frequency band in which a specific UE can perform monitoring/reception may be limited to M(<N) CCs. Various parameters for carrier aggregation may be set up in a cell-specific, UE group-specific, or UE-specific manner.

Figure 11:
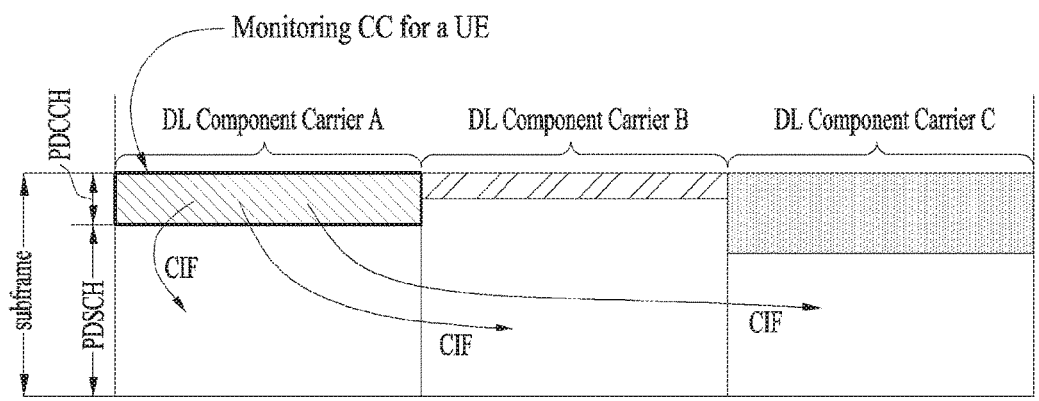
FIG. 11 is a diagram for explaining cross-carrier scheduling.

FIG. 11 illustrates cross-carrier scheduling.

Cross-carrier scheduling refers to, for example, including all downlink scheduling allocation information about a DL CC in the control region of another DL CC for one of multiple serving cells or including all uplink scheduling grant information about multiple UL CCs linked to a DL CC for one of multiple serving cells in the control region of the DL CC.

Regarding cross-carrier scheduling, a carrier indicator field (CIF) will be described first. The CIF may be included in the DCI format transmitted over the PDCCH (and be defined to have, for example, the size of 3 bits), or may not be included in the DCI format (in this case, the CIF may be defined to have, for example, the size of 0 bit). If the CIF is included in the DCI format, this indicates that cross-carrier scheduling is applied. In the case in which cross-carrier scheduling is not applied, the downlink scheduling allocation information is valid within the DL CC through which downlink scheduling allocation information is currently being transmitted. Additionally, the uplink scheduling grant is valid for a UL CC linked to the DL CC through which the downlink scheduling allocation information is transmitted.

In the case in which cross-carrier scheduling is applied, the CIF indicates a CC related to the downlink scheduling allocation information which is transmitted over the PDCCH in a DL CC. For example, referring to FIG. 11, downlink allocation information about DL CC B and DL CC C, i.e., information about PDSCH resources, is transmitted over the PDCCH within the control region of DL CC A. The UE may monitor DL CC A so as to recognize the resource region of the PDSCH and the corresponding CC through the CIF.

Whether or not the CIF is included in the PDCCH may be semi-statically set, and the CIF may be UE-specifically enabled by higher-layer signaling.

When the CIF is disabled, the PDCCH in a specific DL CC allocates a PDSCH resource in the same DL CC and may also allocate a PUSCH resource in a UL CC linked to the specific DL CC. In this case, the same coding scheme, CCE-based resource mapping, DCI format, and so on, as in the legacy PDCCH structure, may be applied.

When the CIF is enabled, the PDCCH in a specific DL CC may allocate a PDSCH/PUSCH resource within a single DL/UL CC indicated by the CIF, among the multiple aggregated CCs. In this case, a CIF may be additionally defined in the legacy PDCCH DCI format. The CIF may be defined as a field having a fixed length of 3 bits, or the CIF position may be fixed regardless of the size of the DCI format. The coding scheme, CCE-based resource mapping, DCI format, and so on of the legacy PDCCH structure may be applied to this case.

When the CIF exists, an eNB may allocate a DL CC set in which the PDCCH is to be monitored. Accordingly, the burden of blind decoding to the UE may be lessened. The PDCCH monitoring CC set corresponds to a portion of all aggregated DL CCs, and the UE may perform PDCCH detection/decoding only in the corresponding CC set. In other words, in order to perform PDSCH/PUSCH scheduling for a UE, the eNB may transmit the PDCCH only in the PDCCH monitoring CC set. The PDCCH monitoring CC set may be UE-specifically or UE group-specifically or cell-specifically configured. For example, when 3 DL CCs are aggregated as illustrated in FIG. 6, DL CC A may be configured as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case where the DL CC A is configured as the PDCCH monitoring CC, the PDCCH may not be transmitted in DL CC B and DL CC C.

Quasi Co-Location (QCL)

Hereinafter, a QC or QCL (Quasi Co-Located) relationship will be described in terms of signal or channel.

When large-scale properties of a signal received through one antenna port can be inferred from another signal received through another antenna port, the two antenna ports may be said to be QCL. Herein, the large-scale properties may include at least one of a delay spread, a Doppler shift, a frequency shift, an average received power, and received timing.

Alternatively, two antenna ports may be said to be QCL when large-scale properties of a channel over which a symbol on one antenna port is transmitted can be inferred from properties of a channel over which another symbol on the other antenna port is transmitted. Herein, the large-scale properties may include at least one of a delay spread, a Doppler spread, a Doppler shift, an average gain, and an average delay.

In using the term QC or QCL in this disclosure, the definition thereof is not distinguished in terms of the signals or channels described above.

The UE may assume that any two antenna ports having the QCL assumption established therebetween are co-located even if the antenna ports are not actually co-located. For example, the UE may assume that two antenna ports having the QCL assumption established therebetween are at the same transmission point (TP).

For example, a specific CSI-RS antenna port, a specific downlink DMRS antenna port, and a specific CRS antenna port may be configured to be QCL. This configuration may correspond to a case in which the specific CSI-RS antenna port, the specific downlink DMRS antenna port, and the specific CRS antenna port are from one serving cell.

Alternatively, a CSI-RS antenna port and a downlink DMRS antenna port may be configured to be QCL. For example, in a CoMP environment in which a plurality of TPs participates, a TP from which a CSI-RS antenna port is actually transmitted may not be explicitly known to the UE. In this case, the UE may be informed that a specific CSI-RS antenna port and a specific DMRS antenna port are QCL. This may correspond to a case in which the specific CSI-RS antenna port and the specific DMRS antenna port are from a certain TP.

In this case, the UE may increase the performance of channel estimation through a DMRS, based on the information about large-scale properties of a channel acquired using a CSI-RS or a CRS. For example, the UE may perform an operation of, for example, attenuating interference of a channel estimated through the DMRS, using the delay spread of a channel estimated through the CSI-RS.

For example, regarding delay spread and Doppler spread, the UE may apply estimation results of the power-delay-profile, the delay spread and Doppler spectrum and the Doppler spread for one antenna port to a Wiener filter which is used in performing channel estimation for another antenna port. In addition, regarding frequency shift and received timing, after the UE performs time and frequency synchronization for an antenna port, it may apply the same synchronization to demodulation on another antenna port. Further, regarding average received power, the UE may average measurements of reference signal received power (RSRP) over two or more antenna ports.

For example, the UE may receive information about a DL scheduling grant through a specific DMRS-based DL-related DCI format (e.g., DCI format 2C) over a PDCCH (or an EPDCCH). In this case, the UE performs channel estimation of a scheduled PDSCH through a configured DMRS sequence and then performs data demodulation. For example, if the UE can make a QCL assumption that a DMRS port configuration received from the DL scheduling grant and a port for a specific RS (e.g., a specific CSI-RS, a specific CRS, a DL serving cell CRS of the UE, etc.) are QCL, then the UE may apply the estimates of the large-scale properties such as the delay spread estimated through the port for the specific RS to implementation of channel estimation through the DMRS port, thereby improving performance of DMRS-based reception.

This is because the CSI-RS or CRS is a cell-specific signal transmitted over the full band in the frequency domain, and thus allows for more accurate recognition of large-scale properties of a channel than the DMRS. Particularly, the CRS is a reference signal that is broadcast with a relatively high density over the full band in every subframe as described above, and thus, generally, estimates of the large-scale properties of a channel may be more stably and accurately acquired from the CRS. On the other hand, the DMRS is UE-specifically transmitted only on specific scheduled RBs, and accordingly accuracy of estimates of the large-scale properties of a channel is lower than in the case of the CRS or the CSI-RS. In addition, even if a plurality of physical resource block groups (PBRGs) are scheduled for a UE, an effective channel received by the UE may change on a PRBG-by-PRBG basis since a precoding matrix that the eNB uses for transmission may change on the PRBG-by-PRBG basis. Therefore, even if large-scale properties of a radio channel are estimated based on the DMRS over a wide band, the accuracy of estimation may be low.

For antenna ports (APs) which are not QCL (non-quasi-co-located (NQC)), the UE cannot assume that the APs have the same large-scale properties. In this case, the UE needs to perform independent processing for each NQC AP regarding timing acquisition and tracking, frequency offset estimation and compensation, delay estimation, and Doppler estimation.

Information indicating whether or not APs are QCL may be provided to the UE through downlink control information (e.g., a PQI field of DCI format 2D (a PDSCH RE mapping and QCL indicator field)). Specifically, parameter sets of a QCL configuration may be preconfigured by a higher layer, and a specific one of the QCL parameter sets may be indicated through the PQI field of DCI format.

In the following, the present invention propose a method of transmitting and receiving a signal between a carrier sensing UE and a base station in a wireless communication system to which a carrier aggregation scheme using an unlicensed band is applied. In the present invention 3GPP LTE system is assumed as an example of a cellular network and IEEE 802.11 system is assumed as an example of a WLAN, by which the present invention may be non-limited.

More specifically, the present invention proposes a carrier sensing method for efficiently controlling channel access between cells in a carrier aggregation situation of a licensed band and an unlicensed band.

Figure 12:
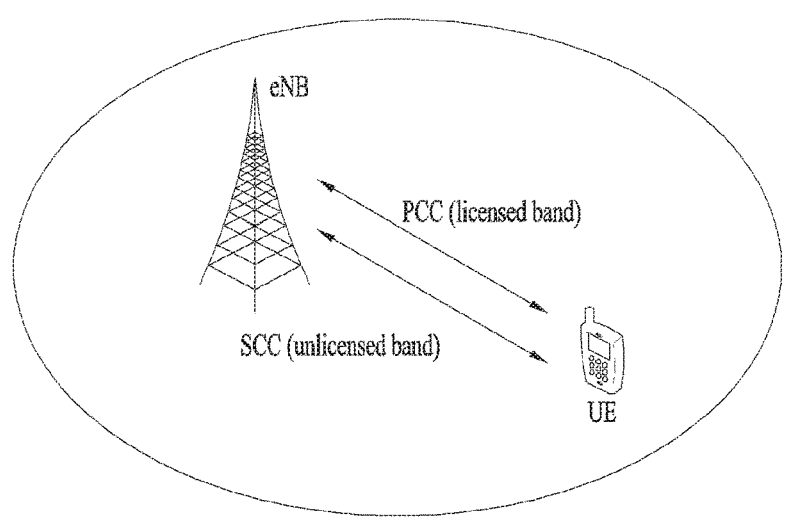
FIG. 12 is a diagram for a communication type of a UE according to an unlicensed band and a licensed band corresponding to one embodiment of the present invention.

FIG. 12 is a diagram for a communication type of a UE according to an unlicensed band and a licensed band corresponding to one embodiment of the present invention. Referring to FIG. 12, it shows a carrier aggregation situation of an LTE band corresponding to a licensed band and an unlicensed band. Specifically, a system is constructed to use a spectrum licensed to all users for the purpose of data offloading of a cellular network in a state that the cellular network is constructed using a spectrum licensed to a specific user only.

In the following description, for clarity, assume that a UE is configured to perform wireless communication through two component carriers in the licensed band and the unlicensed band, respectively, by which the present invention may be non-limited. Yet, methods proposed by the present invention can also be extensively applied to a situation that a plurality of licensed bands and a plurality of unlicensed bands are used via carrier aggregation scheme. In this case, a carrier of the licensed band corresponds to a primary component carrier (primary CC (PCC) or Pcell) and a carrier of the unlicensed band corresponds to a secondary component carrier (secondary CC (SCC) or Scell).

Since an unlicensed band corresponds to a band capable of being used by various devices without a license for the purpose of strengthening an exhausted frequency resource, LTE system and Wi-Fi system may coexist in the unlicensed band and an operation of a contention-based random access scheme is applied. As an example, in case of DL, an eNB can perform carrier sensing (CS) before transmitting and receiving data. The eNB checks whether a current channel state of a Scell is busy or idle. If it is determined as the channel is idle, the eNB transmits a scheduling grant through (E)PD-CCH of a Pcell (i.e., cross carrier scheduling (CCS)) or PDCCH of the Scell and may be then able to attempt to transmit and receive data.

As an example of performing the CS, if reception signal power measured from a current channel is equal to or greater than a prescribed reference value, the channel is determined as busy. If the reception signal power is less than the prescribed reference value, the channel is determined as idle. In this case, the reference value is referred to as a CCA threshold. If a channel is idle, an eNB is able to transmit a signal.

In this case, the eNB can configure a transmission opportunity (TxOP) (or reserved resource period (RRP)) consisting of M number of contiguous subframes. The eNB may inform a UE of an M value and M number of SF usages in advance through higher layer signaling using the Pcell or a physical control channel and/or a physical data channel.

Meanwhile, in case of UL, the UE performs the CS and may be able to determine whether to transmit a signal according to an indication of the eNB.

CS of WiFi system operating on an unlicensed band is explained first before an operation of the present invention is described. A WiFi station (STA) performs CS before transmitting a signal. In case of performing the CS, it may be able to differently apply a threshold according to whether or not a valid WiFi signal is sensed, If the STA fails to sense a valid WiFi signal, the STA determines whether a channel is busy or idle by comparing reception power and first CCA threshold (e.g., −62 dBm) with each other. If the valid WiFi signal is sensed, the STA determines whether a channel is busy or idle by comparing reception power and second CCA threshold (e.g., −82 dBm) with each other.

In case of WiFi, the first CCA is greater than the second CCA threshold in general. If the STA identifies that a currently transmitted signal corresponds to a WiFi signal vulnerable to interference via the aforementioned process, the STA more conservatively attempts signal transmission to obtain an effect of more protecting the WiFi signal.

In general, a WiFi signal transmitted on a specific frequency channel uses the whole bandwidth (e.g., 20 MHz channel unit) of a predetermined channel. Hence, the CS operation can be performed based on signals received on the whole bandwidth in WiFi system.

In order for LTE system to efficiently coexist with WiFi system to which the aforementioned CS principle is applied in an unlicensed band, a basic channel access of the LTE system should be equal to that of the WiFi system. In particular, it is preferable to maintain a probability of using a channel by LTE and a probability of using a channel by WiFi with a similar level.

If a signal rather than a WiFi signal is transmitted, WiFi uses a first CCA threshold higher than a second CCA threshold. Hence, an LTE signal not using the WiFi signal becomes a target to which the first CCA threshold is applied. Therefore, in order for the LTE system and the WiFi system to equally access a channel, it is preferable to apply a high CCA threshold of a similar level. Yet, when the LTE system detects a signal from a different LTE system, if the LTE system maintains the high CCA threshold, the LTE system may cause excessive interference. In this case, if the two LTE systems are able to perform inter-cell interference coordination (ICIC), the LTE systems can perform simultaneous transmission while appropriately avoiding interference.

To this end, the present invention proposes CS and a channel access scheme that enable not only equal channel access with a WiFi system but also ICIC operation with a different LTE system. Specifically, the present invention proposes CS of two stages combined with an ICIC operation. First of all, an eNB or a UE determines whether or not overall transmission is available according to a fair reference with WiFi through CS of a first stage and performs CS of a second stage on every detail transmission resource unit to perform ICIC with a previously transmitted LTE signal.

As mentioned in the following description, the details of the present invention may differently appear according to a relation between a resource of the first stage CS and a resource of the second stage CS. Although it is omitted for clarity, an eNB or a UE performs a series of random backoff operation instead of immediately initiating transmission using a corresponding resource based on a CS result. The eNB or the UE may perform transmission only when CS results, which are determined as idle more than random number, are examined. The random backoff operation can be performed in the first stage CS (i.e., second stage CS is performed only when idle channels as many as the randomly determined number are discovered via the first stage CS). In this case, CS and a transmission operation can be performed without a separate random backoff in the second stage CS. Or, if an idle channel is discovered in the first stage CS, it may immediately proceed to the second stage CS and the random backoff can be performed in the second stage CS.

In this case, a method of performing the second stage CS may operates as follows according to a resource configuration for carrier sensing in each stage. In the following, for clarity, a resource configured in the first stage CS and a resource configured in the second stage CS are referred to as a first CS resource and a second CS resource, respectively.

Embodiment 1: When First Stage CS Resource Includes Second Stage CS Resources

Figure 13:
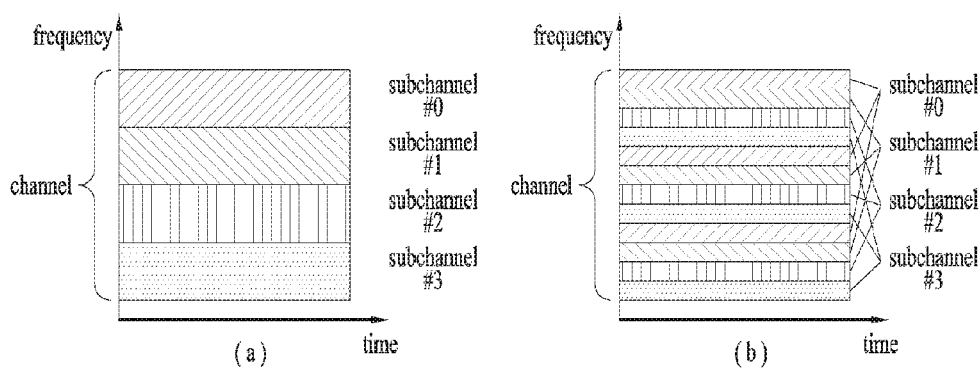
FIG. 13 is a diagram for explaining a resource region in which CS (carrier sensing) is available according to the present invention.

FIG. 13 is a diagram for explaining a resource region in which CS (channel sensing) is available according to the present invention. FIG. 13(a) shows a case that second CS resources are continuous and FIG. 13(b) shows a case that second CS resources are discontinuous.

Referring to FIG. 13, a first stage CS resource may have a frequency domain of a relatively wide bandwidth, the frequency domain is divided into a plurality of frequency groups, and each of a plurality of the frequency groups becomes a unit of a second stage CS resource. In the following, the frequency domain of the first stage CS resource is referred to as a "channel" or "first frequency domain" and each frequency group becoming a target of the second stage CS is referred to as a "subchannel" or "second frequency domain". As shown in FIG. 13(a), one subchannel can be configured in a form of using contiguous frequency resources. As shown in FIG. 13(b), one subchannel can be configured in a form of discontinuous resources for frequency diversity.

As shown in FIG. 13, if one channel is divided into 4 subchannels, an eNB or a UE performs the first stage CS on a channel one time and performs the second stage CS on each subchannel four times in total.

First of all, when the eNB or the UE performs the first stage CS on a channel of a relatively wide bandwidth, the eNB or the UE uses a CCA threshold dedicated to the first stage CS (hereinafter, Th1). As mentioned in the foregoing description, it is preferable that a value of the Th1 has a value similar to the first CCA threshold used in the CS of the WiFi for equal channel reservation between LTE and WiFi. And, it may be able to induce equal channel reservation between LTE and WiFi in a manner that a frequency position of a channel becoming a target of the first stage CS or a size of a frequency domain is configured to be identical to a channel becoming a target of CS in WiFi.

If a channel is determined as idle in the first stage CS, the eNB or the UE potentially expects that the eNB or the UE is able to transmit a signal using one or more subchannels of the channel and performs the second stage CS.

In the second stage CS, the CS is performed according to each subchannel. In particular, in order to perform ICIC with a different LTE system, it may be able to determine whether or not the different LTE system transmits a signal on each subchannel. A subchannel on which a signal is not transmitted by the different LTE system can be determined as idle only. Regarding this, it shall be described in detail in the following.

The second stage CS can be performed by detecting a unique signal of LTE system or can be performed without detecting a different LTE signal. First of all, a method of performing the second stage CS using a unique signal of LTE system is explained in the following.

1-1) Method of Performing Second Stage CS using Unique Signal of LTE System

As a method, it may be able to identify whether or not there exists a LTE signal using a unique signal of an LTE system. The unique signal of the LTE system may correspond to a demodulation reference signal transmitted by each eNB/UE, a synchronization signal for synchronization, a preamble attached to the front of an LTE transmission signal for indicating the existence of the LTE signal, and/or a control signal indicating a position of a signal transmission resource at the following timing.

In order to perform the second stage CS, an eNB or a UE identifies an attribute of a signal to be used by an adjacent eNB/UE in advance and determines whether or not the signal exists in each subchannel. More specifically, if reception power of a unique signal of an LTE system is equal to or greater than a prescribed threshold on a specific subchannel, the eNB/UE can determine it as the subchannel is busy. In this case, the threshold value used in the second stage CS is referred to as a second threshold (or Th2).

Figure 14:
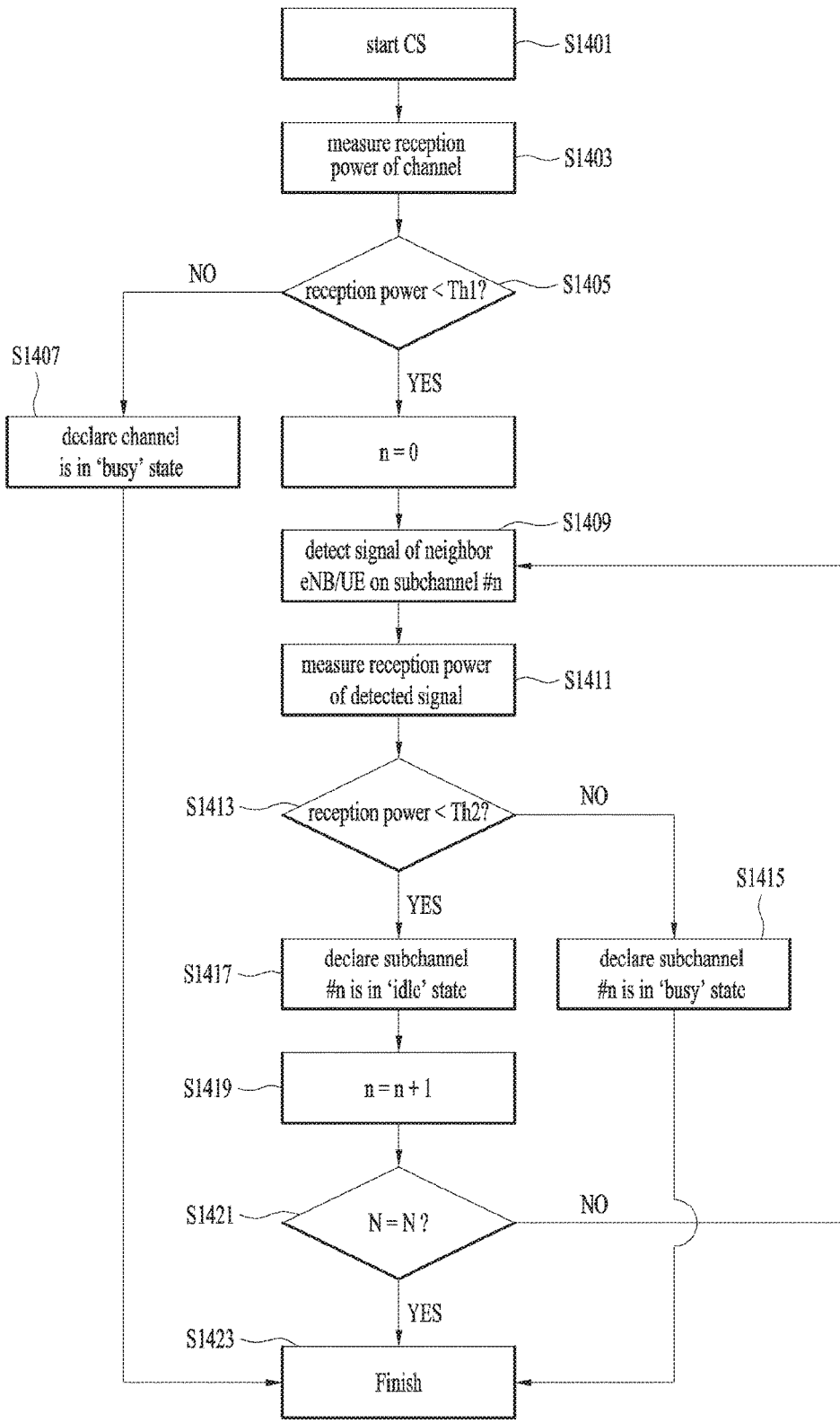
FIG. 14 is a flowchart for a method of transmitting and receiving a signal via second stage CS according to one embodiment of the present invention.

FIG. 14 is a flowchart for a method of transmitting and receiving a signal via CS of two stages according to one embodiment of the present invention.

Referring to FIG. 14, the first stage CS and the second stage CS can be performed as follows.

In the steps S1403 and S1405, an eNB or a UE performs first carrier sensing on a first frequency domain corresponding to an unlicensed frequency band. In the step S1403, the eNB or the UE measures first reception power of the first frequency domain. In the step S1405, the eNB or the UE compares the measured reception power with a first threshold predetermined for the first carrier sensing. In this case, if the first reception power is greater than the first threshold, it is determined as 'busy'. On the contrary, if the first reception power is less than the first threshold, it is determined as 'idle'.

In the step S1407, if the first reception power is greater than the first threshold, the eNB or the UE declares 'busy' and terminates the carrier sensing in the step S1423.

If the first frequency domain is determined as 'idle' as a result of the first carrier sensing, as shown in the steps S1409, S1411, and S1413, the eNB or the UE can perform second carrier sensing on a subchannel. In the step S1409, the eNB or the UE detects a signal transmitted from a neighbor eNB or an adjacent UE in a subchannel #n. as mentioned in the foregoing description, the signal can be detected based on a demodulation reference signal, a preamble, a synchronization signal, a control signal, and the like. In the step S1411, the eNB or the UE measures second reception power corresponding to reception power of the detected signal. In the step S1403, the eNB or the UE compares the measured second reception power with a second threshold predetermined for the second carrier sensing, in this case, if the second reception power is greater than the second threshold, it is determined as 'busy'. On the contrary, if the second reception power is less than the second threshold, it is determined as 'idle'. As mentioned above, the second threshold can be configured by a value smaller than the first threshold.

In the step S1415, if the second reception power is greater than the second threshold, the eNB or the UE declares 'busy' for the subchannel #n and terminates the carrier sensing in the step S1423. In the step S1417, if the second reception power is less than the second threshold, i.e., if the subchannel #n is idle, the eNB or the UE declares that the subchannel #n is idle.

Subsequently, the eNB or the UE repeats the second CS for a different subchannel while changing n in the step S1421. For example, if total N number of subchannels ranging from a subchannel #0 to a subchannel #N-1 are included in a first control region or a channel, CS for each subchannel is performed while n is increased by 1 from 0 until channel sensing is performed on the subchannel #N-1. In this case, repeating the second CS for a subchannel means that the steps S1409 to S1421 are repeatedly performed. In the step S1421, if the n arrives at N, channel sensing ends in the step S1423.

Subsequently, one of uplink signal transmission and downlink signal reception can be performed by the eNB on at least one or more subchannels which are detected as idle channels.

In this case, if the Th2 is configured to relatively lower the CCA threshold compared to the Th1, it may avoid the previously existing LTE system. More specifically, when a channel is divided into N number of subchannels, if power corresponding to the Th1 is uniformly distributed to the whole of channels, power received via each subchannel becomes Th1−10*log 10(N) in log scale. If the Th2 is configured by a value smaller than a value of the power, i.e., if the second stage CS is performed by applying a more conservative reference in a situation that the first stage CS is passed, it is able to transmit a signal using a subchannel on which legacy LTE transmission definitely does not exists while maintaining interference to a subchannel on which the legacy LTE transmission exists with a sufficiently low level.

In this case, the Th2 can be fixed by a value or can be adjusted between an adjacent eNB and a UE in consideration of an interference level acceptable by both the adjacent eNB and the UE. In particular, if the adjacent eNB/UE is able to accept strong interference, it may use a higher Th2. If the adjacent eNB/UE is sensitive to interference, it may use a lower Th2. Of course, since the acceptable interference level can be differently configured according to a subchannel, a Th2 value used in the second stage CS can be differently configured according to a subchannel. As an example, since an adjacent eNB does not use a specific subchannel, the adjacent eNB may experience strong interference with no problem, whereas the adjacent eNB may use a different subchannel to transmit a signal to a UE which is sensitive to interference. Hence, interference should be maintained with a low level.

As an extreme case, the Th2 can be configured as infinite on a specific subchannel to make the subchannel to be used for transmission all the time. In particular, when the Th2 of the specific subchannel is configured as infinite, it may indicate that priority of using the subchannel is assigned to the eNB/UE. In particular, the eNB/UE can use the subchannel at any time irrespective of the use of a different eNB/UE. In this case, it may assume a case that a channel is determined as idle in the first stage CS. The priority can be assigned according to an operator.

To this end, an eNB may inform an adjacent eNB of Th2 value which is configured by the eNB according to a subchannel or may transmit a signal for asking the adjacent eNB to increase or decrease a Th2 value used on each subchannel to the adjacent eNB. When the above-mentioned operation is performed, if a subchannel is determined as idle in the second stage CS, it means that possibility of using the subchannel for transmission is permitted only. It may also be able to configure a part of idle subchannels not to be used for transmission in consideration of traffic status of a corresponding eNB/UE or a resource coordination relation with a different eNB/UE.

Figure 15:
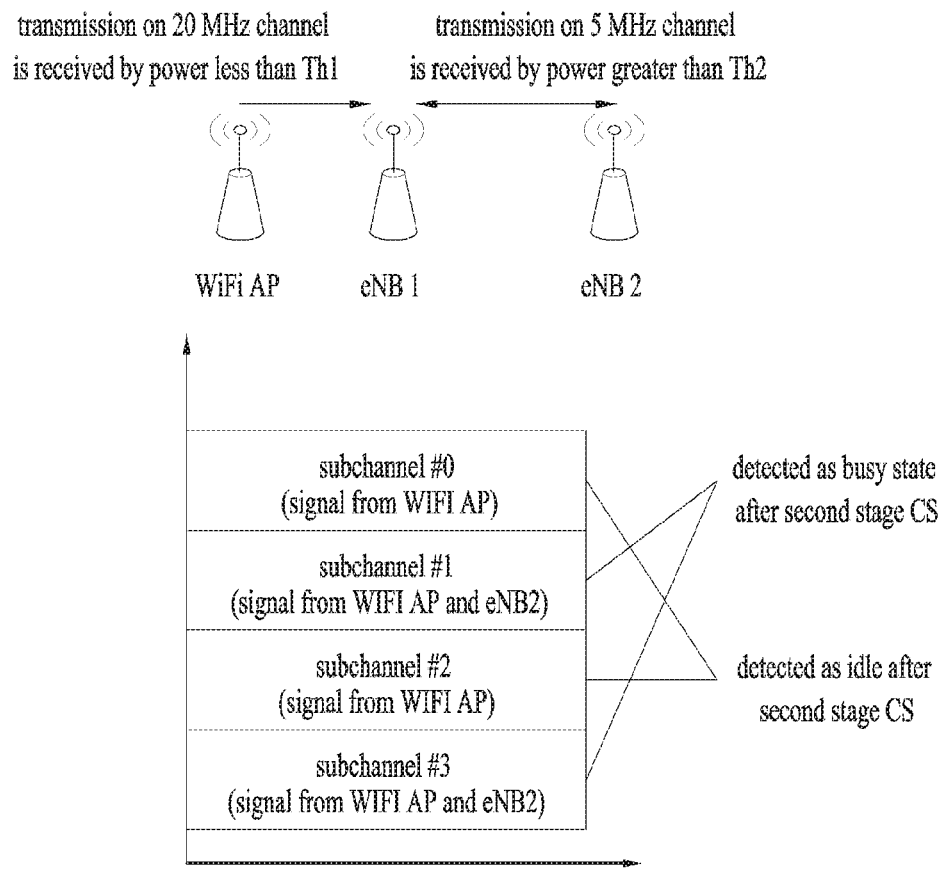
FIG. 15 is a diagram for one embodiment of an operation according to a method of performing CS of two stages of the present invention.

FIG. 15 is a diagram for one embodiment of an operation according to a method of performing CS of two stages of the present invention. In FIG. 15, a CS operation of an eNB (eNB1 in FIG. 15) is described. Yet, following description can also be applied to a CS operation of a UE.

Referring to FIG. 15, a signal from WiFi AP (access point) is transmitted on subchannels #0 and #2 and signals from WiFi AP and an eNB2 are transmitted on subchannels #1 and #3.

And, when an adjacent WiFi AP (access point) transmits a signal using the whole channel of 20 MHz, reception power received from the eNB1 is equal to or less than Th1. In case of an eNB2 adjacent to the eNB1, when the eNB2 transmits a signal using two subchannels (subchannels #1 and #3) among 4 subchannels, reception power is greater than Th2 on the two subchannels, respectively. When the WiFi AP and the eNB2 perform transmission at the same time, assume that signal reception power of the whole channel detected by the eNB1 in the first stage CS is still equal to or less than the Th1.

In this case, the eNB1 determines that a channel is idle via the first stage CS and transmits a signal. As shown in FIG. 15, the eNB1 determines that subchannels #0 and #2 are idle via the second stage CS and finally selects the subchannels #0 and #2 as transmission subchannel candidates of the eNB1. Hence, interference does not influence on a signal of the eNB2 transmitted on the subchannels #1 and #3.

1-2) Method of Performing Second Stage CS using Reception Power of Subchannel Only without Signal Detection Process Since the method mentioned earlier with reference to 1-1) performs a signal detection process, it is able to more certainly identify whether or not there exists a LTE signal. However, the method may have a problem in terms of implementation complexity, reliability of detection, and battery consumption. In order to reduce the problem, it may be able to perform the second stage CS using reception power of each subchannel only without performing the signal detection process. In this case, the second stage CS can be performed in a manner of comparing reception power measured from each subchannel with Th2 while basically following the operation mentioned earlier in 1-1) and omitting the step (the step S1409 of FIG. 14) of detecting a signal of an adjacent eNB/UE.

Although an eNB and/or a UE intends to transmit a signal using a partial subchannel only among subchannels included in a channel, a specific operation of the methods 1-1 to 1-2 is to perform the first stage CS based on reception power of all channels including the partial subchannel. As mentioned in the foregoing description, this is intended for equal channel reservation with a different system intending to use the whole bandwidth of the channel.

In case of uplink that a UE transmits a signal to an eNB, a main entity of the first stage CS may differ from a main entity of the second stage CS. As an example, when an eNB performs the first stage CS and determines a specific subchannel as idle, the eNB designates the specific subchannel as a transmission resource of a specific UE. Having received the transmission resource, the UE performs the second stage CS on the subchannel. If the subchannel is also determined as idle, the UE performs signal transmission according to an indication of the eNB.

Embodiment 2: When First Stage CS Resource does not Include Second Stage CS Resources The aforementioned second stage CS can also be applied to a case that a first stage CS resource does not include a second stage CS resource. As an example, assume that the whole of unlicensed band includes K number of channels.

In this case, a specific channel can be assigned to a specific eNB/UE as a channel having priority and the remaining channels can be opportunistically used via the second stage CS. For example, the channel can be assigned to a specific operator to make the specific operator has priority. By doing so, an eNB and/or UEs belonging to the specific operator may preferentially use the channel. In this case, the remaining channels except the specific channel can be opportunistically used in an unlicensed band. For clarity, assume that a specific eNB/UE has priority on a channel #0. In this case, the remaining channels including a channel #1, . . . , a channel #(K−1) correspond to resources that priority is not assigned to the eNB/UE. In this case, the remaining channels including a channel #1, . . . , a channel #(K−1) can be opportunistically used by applying the principle of the CS of the aforementioned two stages.

In particular, the eNB/UE performs the first stage CS on the channel #0 where priority is assigned to the eNB/UE using Th1. If the channel is determined as idle, the eNB/UE performs the second stage CS on the channel #1, . . . the channel #(k−1) where priority is not assigned to the eNB/UE using Th2. The eNB/UE can utilize a channel finally determined as idle for the purpose of transmitting a signal.

In particular, as mentioned in the foregoing description, in case of the second stage CS using the Th2, it may use the Th2 based on a LTE signal detected in advance or it may use a value smaller than the Th1 as the Th2. By doing so, it may be able to protect a signal of a different eNB/UE capable of being existed on the channel #1, . . . the channel #(k−1) where priority is not assigned to the eNB/UE. In this case, using a value smaller than the Th1 as the Th2 can be applied under an assumption that a bandwidth of each channel is the same.

When the first stage CS resource does not include the second stage CS resource, an operation of performing the CS of the two stages is performed on a channel to which priority is not assigned only when a channel where priority is assigned to an eNB/UE is idle. Consequently, when a priority channel is busy, it may be able to block an operation of occupying a channel to which priority is not assigned as an alternative.

In particular, the aforementioned method may be effective when a plurality of operators operate on the same unlicensed band and degree of distribution of eNB/UE is different. As an example, assume a situation that an operator A has priority on a channel #1 and installs the large number of eNBs and a situation that an operator B has priority on a channel #2 and installs the small number of eNBs.

In this case, eNBs of the operator A intend to preferentially use the channel #1. As a result, it is highly probable that the channel #1 becomes busy. In this case, if the eNBs of the operator A are able to use the channel #2 irrespective of idle/busy of the channel #1, although the eNBs of the operator B has priority, the large number of eNBs of the operation A, which have no priority on the channel #2, performs transmission on the channel #2, thereby deteriorating the performance of the operator B.

Hence, if a probability of the operator A capable of using the channel #2 where priority is assigned to the operator B is always maintained to be equal to or less than a probability of the operator A capable of using the channel #1 where priority is assigned to the operator A using the aforementioned CS of the two stages, it is preferable. Moreover, when a specific eNB/UE performs transmission on a channel where priority is not assigned to the specific eNB/UE, it may be able to regulate the specific eNB/UE to always perform transmission on a channel where priority is assigned to the specific eNB/UE as well.

In particular, as mentioned in the foregoing description, the eNB/UE performs the first stage CS using the Th1 on the channel #0 where priority is assigned to the eNB/UE. If the channel is determined as idle, the eNB/UE performs the second stage CS using the TH2 on the channel #1, . . . , #(k−1) where priority is not assigned to the eNB/UE. The eNB/UE can utilize a channel finally determined as idle for the purpose of transmitting a signal. The eNB/UE can protect a signal of a different eNB and/or a UE capable of being existed on the channel #1, . . . , #(K−1) where priority is not assigned to the eNB/UE by using a value smaller than the Th1 as the Th2.

As a different example, the eNB/UE performs the first stage CS using the Th1 on the channel #0 where priority is assigned to the eNB/UE and may be able to perform the second stage CS using the Th2 on the channel #1, . . . , #(K−1) where priority is not assigned to the eNB/UE only when the channel #0 is determined as idle. And, the eNB/UE may utilize a channel finally determined as idle for the transmission usage. In this case, since the channel #0 is preferentially used, a probability of using a different channel can be reduced.

If it is able to solve the aforementioned priority channel reservation problem using a CCA threshold configuration only, it is not mandatory to perform the CS of the two stages. In this case, it is able to perform independent CS according to a channel. Yet, since there may exist a difference in terms of priority of eNB/UE according to a channel or degree of accepting interference of an adjacent eNB/UE, it may be able to differently configure a CCA threshold according to a channel. Of course, to this end, eNBs can exchange suitable information with each other in advance via a backhaul signal.

Figure 16:
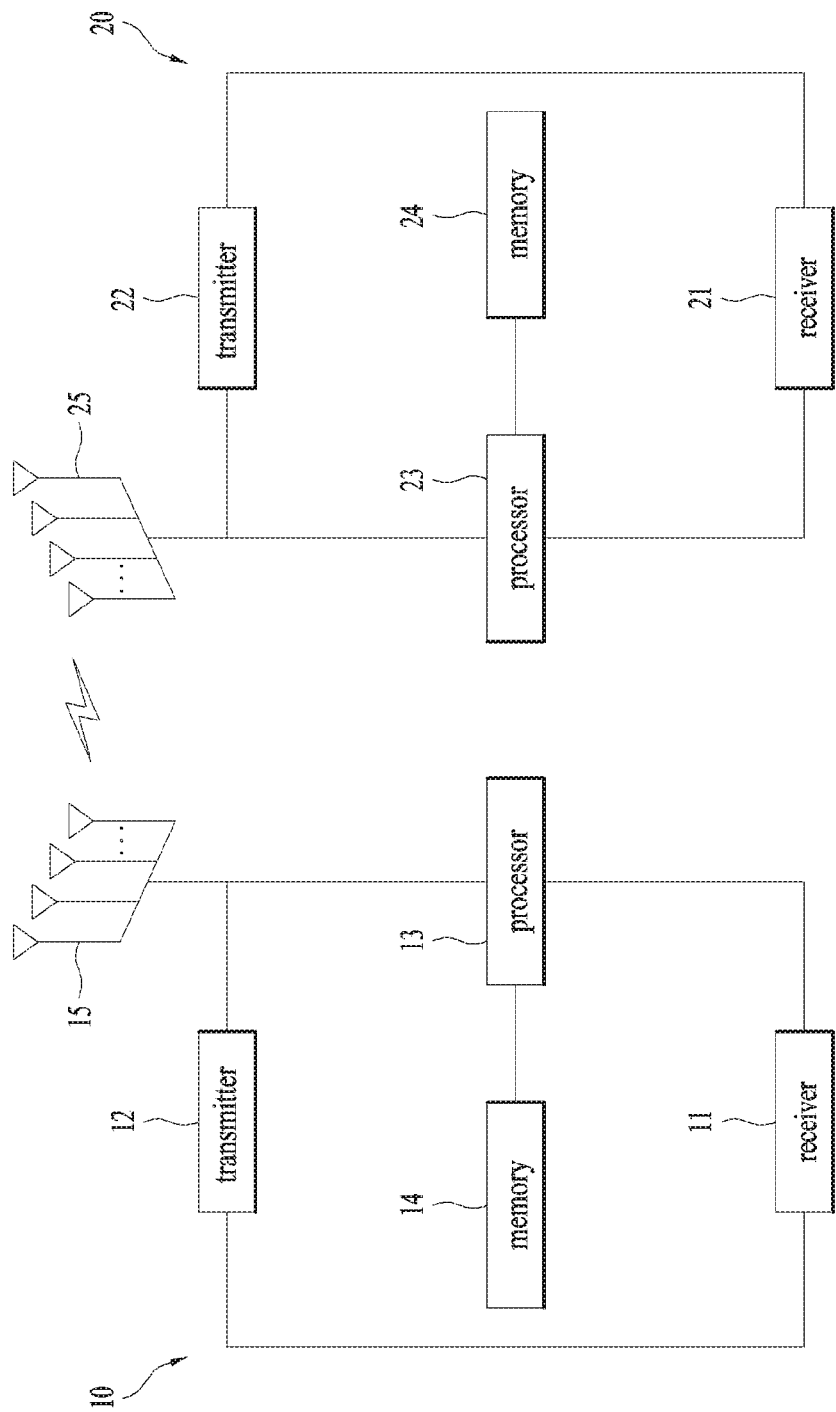
FIG. 16 is a diagram for a configuration of a preferred embodiment of a base station and a user equipment according to the present invention.

FIG. 16 is a diagram illustrating configurations of a UE and an eNB according to one embodiment of the present invention.

Referring to FIG. 16, an eNB 10 may include a receive module 11, a transmit module 12, a processor 13, a memory 14, and a plurality of antennas 15. The receive module 11 may receive various signals, data and information from external devices (e.g., a UE). The transmit module 12 may transmit various signals, data and information to external devices (e.g., a UE). The processor 12 may control overall operation of the eNB 10. The antennas 15 suggest that the eNB 10 supports MIMO transmission and reception.

A base station 10 according to an example of the present invention can be configured to perform carrier sensing on a prescribed frequency domain. A processor 13 performs CS of two stages and may be able to control a transmission module 12 to transmit a downlink signal to a user equipment 20 or receive an uplink signal from the user equipment 20 via an idle channel. Besides, the processor 13 of the base station 10 performs a function of processing information received by the base station 10, information to be transmitted to the external, and the like. A memory 14 stores the processed information for prescribed time and can be replaced with such a configuration element as a buffer (not depicted).

Referring to FIG. 16, the user equipment 20 according to the present invention can include a reception module 21, a transmission module 22, a processor 23, a memory 24, and a plurality of antennas 25. The reception module 21 can receive various signals, data, and information from an external device (e.g., base station). The transmission module 22 can transmit various signals, data, and information to an external device (e.g., base station). The processor 23 can control overall operation of the user equipment 20. A plurality of the antennas 25 supports MIMO transmission and reception of the user equipment 20.

The user equipment 20 according to an example of the present invention can be configured to perform carrier sensing on a prescribed frequency domain. A processor 23 performs CS of two stages and may be able to control a transmission module 22 to transmit an uplink signal to a base station 10 or receive a downlink signal from the base station 10 via an idle channel.

Besides, the processor 23 of the user equipment 20 performs a function of processing information received by the user equipment 20, information to be transmitted to the external, and the like. A memory 24 stores the processed information for prescribed time and can be replaced with such a configuration element as a buffer (not depicted).

The configurations of the eNB 10 and the UE 20 as described above may be implemented such that details of the various embodiments described above are independently applied or two or more embodiments are simultaneously applied. Redundant description is omitted.

In describing the various embodiments of the present invention above, the eNB has been exemplarily described as serving as a downlink transmit entity or an uplink receive entity, and the UE has been exemplarily described as serving as a downlink receive entity or an uplink transmit entity. However, embodiments of the present invention are not limited thereto. For example, the description of the eNB given above may be equally applied to a case in which a cell, an antenna port, an antenna port group, an RRH, a transmission point, a reception point, an access point, and a relay serve as a downlink transmit entity or an uplink receive entity with respect to the UE. In addition, the principle of the present invention described above through various embodiments may be equally applied to a case in which a relay serves as a downlink transmit entity or an uplink receive entity with respect to the UE or to a case in which the relay serves as an uplink transmit entity or a downlink receive entity with respect to the eNB.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The aforementioned embodiments of the present invention can be applied to various mobile communication systems.

What is claimed is:
1. A method of transmitting and receiving a signal with a base station (BS) in a first wireless communication system supporting a carrier aggregation scheme, the method performed by a user equipment (UE) and comprising:
    performing first carrier sensing for a second wireless communication system on a channel configured for a prescribed frequency region of an unlicensed frequency band;

performing second carrier sensing for the first wireless communication system on a sub-channel contained in the channel if the channel is in an idle state; and performing either uplink signal transmission to the BS or downlink signal reception from the BS on the sub-channel if the sub-channel is in an idle state.

2. The method of claim 1, wherein the first carrier sensing comprises:

measuring reception power of the channel; and comparing the measured reception power with a predetermined threshold value.

3. The method of claim 2, wherein the threshold value is predetermined value considering a signal for the second wireless communication system.

4. The method of claim 1, wherein the second carrier sensing comprises:

measuring reception power of the sub-channel; and comparing the measured reception power with a predetermined threshold value.

5. The method of claim 4, wherein:

the second carrier sensing further comprises detecting a signal of a neighbor cell or a neighbor UE on the sub-channel; and the reception power of the sub-channel is measured using the detected signal.

6. The method of claim 4, wherein the second carrier sensing is performed without detecting a signal of a neighbor BS or a neighbor UE.

7. The method of claim 4, wherein:

the sub-channel is determined as being in a busy state if the measured reception power is greater than the threshold value; and the sub-channel is determined as being in the idle state if the measured reception power is less than the threshold value.

8. The method of claim 4, wherein the threshold value is smaller than a predetermined threshold value for sensing the first carrier.

9. The method of claim 1, wherein:

the first wireless communication system is an LTE system or an LTE-A system; and the second wireless communication system is a Wi-Fi system.

10. A method of transmitting and receiving a signal with a user equipment (UE) in a first wireless communication system supporting a carrier aggregation scheme, the method performed by a base station (BS) and comprising:

performing first carrier sensing for a second wireless communication system on a channel configured for a prescribed frequency region of an unlicensed frequency band;

performing second carrier sensing for the first wireless communication system on a sub-channel contained in the channel if the channel is in an idle state; and performing either downlink signal transmission to the UE or uplink signal reception from the UE on the sub-channel if the sub-channel is in an idle state.

11. The method of claim 10, wherein the first carrier sensing comprises:

measuring reception power of the channel; and comparing the measured reception power with a predetermined threshold value.

12. The method of claim 10, wherein the second carrier sensing comprises:

measuring reception power of the sub-channel; and comparing the measured reception power with a predetermined threshold value.

13. The method of claim 10, wherein:

the first wireless communication system is an LTE system or an LTE-A system; and the second wireless communication system is a Wi-Fi system.

14. A user equipment (UE) supporting a carrier aggregation scheme, the UE comprising:

a transceiving module configured to transmit and receive information; and a processor configured to:

perform first carrier sensing for a second wireless communication system on a channel configured for a prescribed frequency region of an unlicensed frequency band;

perform second carrier sensing for the first wireless communication system on a sub-channel contained in the channel if the channel is in an idle state; and control the transceiving module to perform either uplink signal transmission to the BS or downlink signal reception from the BS on the sub-channel if the sub-channel is in an idle state.

15. The UE of claim 14, wherein the first carrier sensing comprises:

measuring reception power of the channel; and comparing the measured reception power with a predetermined threshold value.

16. The UE of claim 14, wherein the second carrier sensing comprises:

measuring reception power of the sub-channel; and comparing the measured reception power with a predetermined threshold value.

17. A base station (BS) supporting a carrier aggregation scheme, the BS comprising:

a transceiving module configured to transmit and receive information; and a processor configured to:

perform first carrier sensing for a second wireless communication system on a channel configured for a prescribed frequency region of an unlicensed frequency band;

perform second carrier sensing for the first wireless communication system on a sub-channel contained in the channel if the channel is in an idle state; and control the transceiving module to perform either downlink signal transmission to the UE or uplink signal reception from the BS on the sub-channel if the sub-channel is in an idle state.

18. The BS of claim 17, wherein the first carrier sensing comprises:

measuring reception power of the channel; and comparing the measured reception power with a predetermined threshold value.

19. The BS of claim 17, wherein the second carrier sensing comprises:

measuring reception power of the sub-channel; and comparing the measured reception power with a predetermined threshold value.

* * * * *